United States Patent
Jin et al.

(10) Patent No.: US 11,570,615 B2
(45) Date of Patent: Jan. 31, 2023

(54) METHOD AND APPARATUS FOR REPORTING CAPABILITY OF USER EQUIPMENT IN WIRELESS COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/969,920

(22) PCT Filed: Apr. 1, 2020

(86) PCT No.: PCT/KR2020/004456
§ 371 (c)(1),
(2) Date: Aug. 13, 2020

(87) PCT Pub. No.: WO2020/209541
PCT Pub. Date: Oct. 15, 2020

(65) Prior Publication Data
US 2021/0243590 A1 Aug. 5, 2021

(30) Foreign Application Priority Data
Apr. 8, 2019 (KR) .......................... 10-2019-0041058

(51) Int. Cl.
*H04W 8/24* (2009.01)
*H04L 5/00* (2006.01)
*H04W 76/27* (2018.01)
*H04W 84/04* (2009.01)

(52) U.S. Cl.
CPC ........... *H04W 8/245* (2013.01); *H04L 5/0053* (2013.01); *H04W 76/27* (2018.02); *H04W 84/042* (2013.01)

(58) Field of Classification Search
CPC .............................. H04W 8/22; H04W 76/11
See application file for complete search history.

(56) References Cited

FOREIGN PATENT DOCUMENTS

| EP | 1718095 A1 * | 11/2006 | ............ H04W 36/14 |
| WO | 2013091665 A1 | 6/2013 | |
| WO | WO-2020192779 A1 * | 10/2020 | .............. H04W 8/24 |

OTHER PUBLICATIONS

International Search Report and Written Opinion of the International Searching Authority in connection with International Application No. PCT/KR2020/004456 dated Jul. 16, 2020, 11 pages.

(Continued)

*Primary Examiner* — Kevin Kim

(57) ABSTRACT

Provided is a communication method of a user equipment (UE) in a wireless communication system, the communication method including receiving a UE capability information request triggered by a core network from a base station and transmitting a non-access stratum (NAS) message including a UE capability identifier to the base station, in which the UE capability identifier is assigned by the core network through NAS signaling.

13 Claims, 21 Drawing Sheets

(56) References Cited

OTHER PUBLICATIONS

3GPP TR 23.743 V2.0.0 (Mar. 2019), Technical Report, 3rd Generation Partnership Project; Technical Specification Group Services and System Aspects; Study on optimisations of UE radio capability signalling (Release 16), 58 pages.

Mediatek Inc., "KI#1—Standardized UE Capability ID," S2-1810143 (revision of S2-187974), SA WG2 Temporary Document, SA WG2 Meeting #129, Dongguan, PRC, Oct. 15-19, 2018, 3 pages.

Mediatek Inc., "KI#1—UE Capability ID with delta set of UE Radio Capabilities," S2-1810144 (revision of S2-18nnnn), SA WG2 Temporary Document, SA WG2 Meeting #129, Dongguan, PRC, Oct. 15-19, 2018, 3 pages.

Mediatek Inc., "KI#1—Preliminary evaluation of Solutions for UE Capability ID," S2-1810145 (revision of S2-18nnnn), SA WG2 Temporary Document, SA WG2 Meeting #129, Dongguan, PRC, Oct. 15-19, 2018, 3 pages.

European Patent Office, "Supplementary European Search Report" dated Mar. 30, 2022, in connection with European Patent Application No. 20788272.1, 10 pages.

3GPP TR 23.743 v1.0.0 (Dec. 2018); Technical Report; 3rd Generation Partnership Project; Technical Specification Group Services and System Aspects; Study on optimisations of UE radio capability signalling; (Release 16); 52 pages.

SA2, "Reply LS on Interim conclusions for SA2 study on Radio Capabilities Signalling Optimisations (FS RACS)" SA WG2 Meeting #82-130, S2-1901034, Jan. 21-25, 2019, Kochi, India, 3 pages.

Oppo, "RACS_UE manufacturer specific iD revert" SA WG2 Meeting #130, S2-1901559, Feb. 25-Mar. 1, 2019, Santa Cruz-Tenerife, Spain, 4 pages.

\* cited by examiner

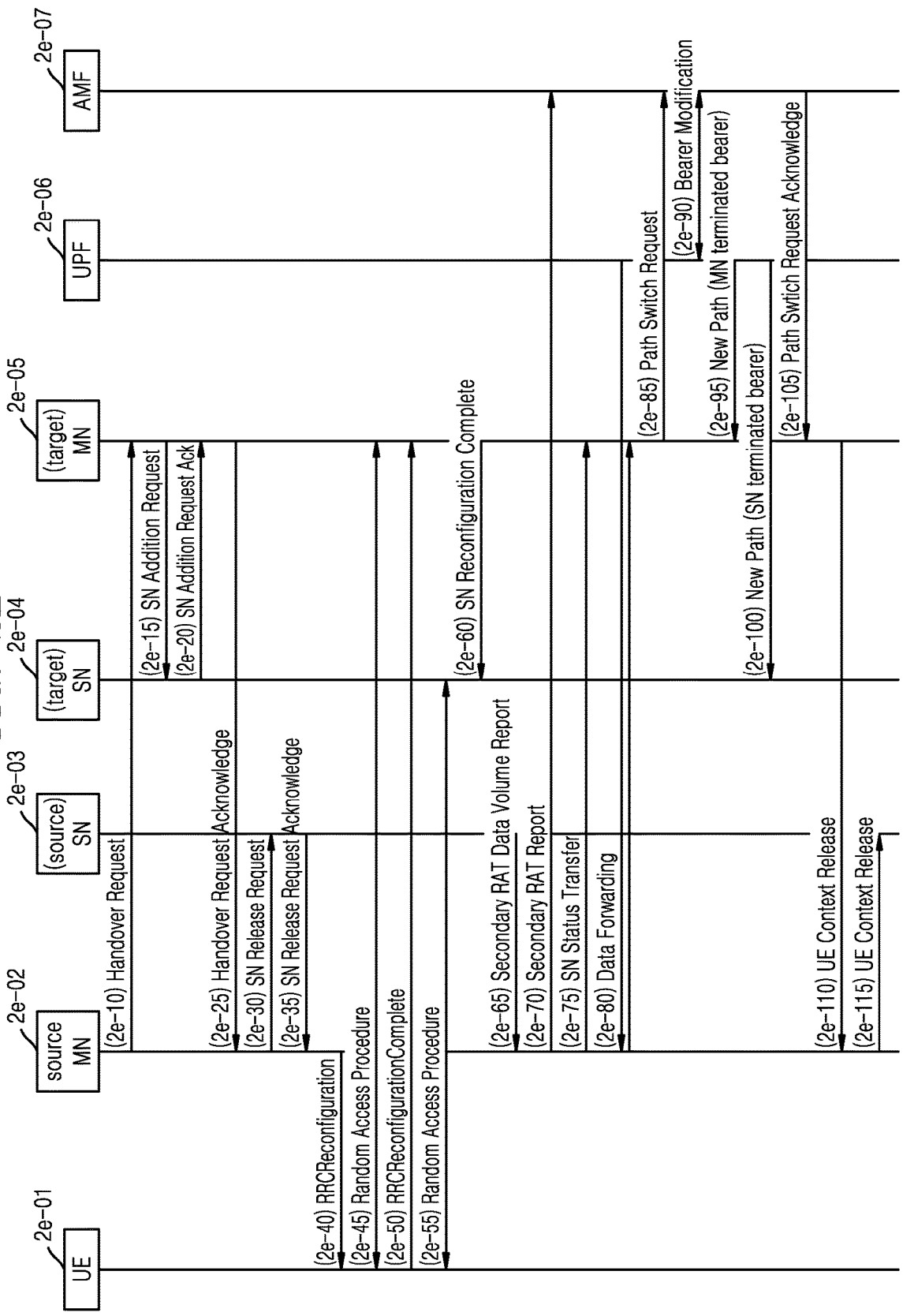

METHOD AND APPARATUS FOR REPORTING CAPABILITY OF USER EQUIPMENT IN WIRELESS COMMUNICATION SYSTEM

CROSS-REFERENCE TO RELATED APPLICATIONS

This application is a 371 National Stage of International Application No. PCT/KR2020/004456, filed Apr. 1, 2020, which claims priority to Korean Patent Application No. 10-2019-0041058, filed Apr. 8, 2019, the disclosures of which are herein incorporated by reference in their entirety.

BACKGROUND

1. Field

The present disclosure relates to a method and apparatus for reporting a user equipment (UE) capability in a wireless communication system. The present disclosure may include a method, performed by a UE, of reporting a capability of the UE in a wireless communication system.

2. Description of Related Art

To meet the soaring demand with respect to wireless data traffic because of the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. The 5G communication system prescribed in the $3^{rd}$ Generation Partnership Project (3GPP) is called a new radio (NR) system. To achieve higher data transmission rates, implementation of developing communication systems in ultra-high frequency bands millimeter wave (mmWave), such as, e.g., 60 GHz, is being considered. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss of radio waves and to increase a propagation distance of radio waves in the ultra-high frequency band, and have also been applied to NR systems. For system network improvement, in 5G communication systems, technologies such as evolved small cell, advanced small cell, cloud radio access network (RAN), ultra-dense network, device to device (D2D) communication, wireless backhaul, moving network, cooperative communication, coordinated multi-points (CoMPs), and interference cancellation have been developed. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet, which is a human-oriented connectivity network where humans generate and consume information, is now evolving into the Internet of Things (IoT), where distributed entities, such as things, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, an array antenna, and so forth. The application of cloud RAN as a Big Data processing technology may also be an example of the convergence of 5G technology and IoT technology.

Various services may be provided along with the foregoing techniques and development of wireless communication systems, and accordingly, ways of effectively providing such services are required.

SUMMARY

Disclosed embodiments provide an apparatus and method for effectively providing a service in a wireless communication system.

Disclosed embodiments provide an apparatus and method for effectively providing a service in a wireless communication system.

According to disclosed embodiments, a service may be effectively provided in a wireless communication system.

BRIEF DESCRIPTION OF THE DRAWINGS

FIG. 2E is a flowchart for describing a case where secondary cell group changing and handover requesting are performed through one radio resource control (RRC) message, according to an embodiment.

DETAILED DESCRIPTION

Figure 1A:
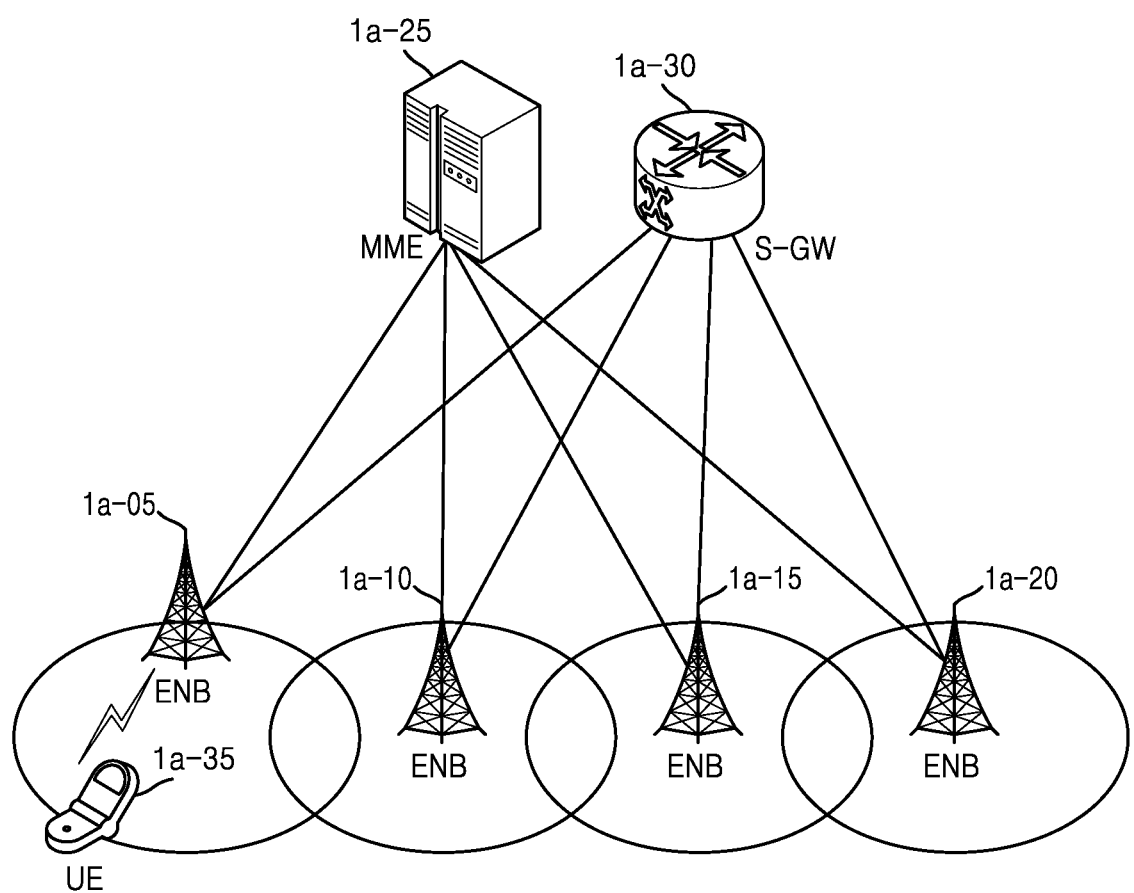
FIG. 1A illustrates a structure of a long term evolution (LTE) system according to an embodiment.

A communication method of a user equipment (UE) in a wireless communication system according to an embodiment of the present disclosure includes receiving a UE capability information request triggered by a core network from a base station and transmitting a non-access stratum (NAS) message including a UE capability identifier to the base station, in which the UE capability identifier is assigned by the core network through NAS signaling.

The UE capability information request may include radio access technology (RAT) type information, and the UE capability identifier may be configured based on the RAT type information.

The UE capability identifier may include a public land mobile network (PLMN)-based UE capability identifier or a manufacturer-based UE capability identifier.

Only a certain number of PLMN-based UE capability identifiers may be stored in the UE, and when a number of PLMN-based UE capability identifiers exceeds the certain number, previously stored PLMN-based UE capability identifiers may be deleted.

The transmitting of the NAS message including the UE capability identifier may include transmitting an NAS message including the manufacturer-based UE capability identifier when the UE is not assigned with the PLMN-based UE capability identifier.

The communication method may further include determining whether capability information of the UE has changed and receiving a message including information indicating that a new PLMN-based UE capability identifier needs to be updated, based on a result of the determination, when capability information of the UE has changed.

The communication method may include storing the UE capability identifier corresponding to UE capability information, and the UE capability information in a mapping table form.

A communication method of an entity in a core network in a wireless communication system according to an embodiment of the present disclosure includes transmitting a message requesting UE capability information to a UE through a base station and receiving an NAS message including a UE capability identifier through the base station, in which the UE capability identifier is assigned by the core network through NAS signaling.

The UE capability information request may include RAT type information, and the UE capability identifier may be configured based on the RAT type information.

The communication method may further include identifying the UE capability identifier and determining whether UE capability information corresponding to the UE capability identifier are stored, in which the UE capability identifier and the UE capability information are stored in a mapping table form.

The UE capability identifier may include a PLMN-based UE capability identifier or a manufacturer-based UE capability identifier.

The receiving of the NAS message including the UE capability identifier may include receiving an NAS message including the manufacturer-based UE capability identifier when the UE is not assigned with the PLMN-based UE capability identifier.

The communication method may further include receiving a message including information indicating that a new PLMN-based UE capability identifier needs to be updated, based on a result of the determination, when capability information of the UE has changed.

According to an embodiment of the present disclosure, a UE for providing UE capability information in a wireless communication system includes a transceiver and at least one processor coupled with the transceiver configured to receive a UE capability information request triggered by a core network from a base station and transmit a non-access stratum (NAS) message including a UE capability identifier to the base station, in which the UE capability identifier is assigned by the core network through NAS signaling.

According to an embodiment of the present disclosure, an entity in a core network to communicate based on UE capability information in a wireless communication system includes a transceiver and at least one processor coupled with the transceiver configured to transmit a message requesting UE capability information to a UE through a base station and receive a non-access stratum (NAS) message including a UE capability identifier through the base station, in which the UE capability identifier is assigned by the core network through NAS signaling.

Hereinafter, the operating principles of the present disclosure will be described in detail with reference to the accompanying drawings. Moreover, a detailed description of well-known functions or elements associated with the present disclosure will be omitted if it unnecessarily obscure the subject matter of the present disclosure. Further, the terminologies to be described below are defined in consideration of functions in the present disclosure and may vary depending on a user's or operator's intention or practice. Therefore, the terms should be defined based on the overall disclosure. As used in the following description, a term for identifying an access node, terms referring to network entities, terms referring to messages, a term referring to an interface between network objects, and terms referring to various identification information are illustrated for convenience of explanation. Therefore, the disclosure is not limited by the following terms, and other terms indicating targets having equivalent technical meanings may be used.

Hereinbelow, for convenience of a description, the present disclosure employs terms and names defined in the 3'-Generation Partnership Project Long Term Evolution (3GPP LTE) standards. However, the present disclosure is not limited by such terms and names, and may be equally applied to systems complying with other standards.

Hereinafter, embodiments of the disclosure will be described in detail with reference to the accompanying drawings. When determined to make the subject matter of the disclosure unclear, the detailed description of related functions or configurations may be skipped. The terms as used herein are defined considering the functions in the present disclosure and may be replaced with other terms according to the intention or practice of the user or operator. Therefore, the terms should be defined based on the overall disclosure. Hereinbelow, a base station is an entity that performs resource assignment of the terminal, and may be at least one of gNode B, an evolved Node B (eNode B), Node B, a base station (BS), a wireless access unit, a base station controller, or a node on a network. A terminal may include a user equipment (UE), a mobile station (MS), a cellular phone, a smartphone, a computer, or a multimedia system capable of performing communication functions. In the present disclosure, a downlink (DL) may mean a wireless transmission path of a signal for transmission from the base station to the UE, and an uplink (UL) may mean a wireless transmission path of a signal for transmission from the UE to the base station. While embodiments of the disclosure are described by using a new radio (NR) system or a long term evolution (LTE)/LTE-advanced (LTE-A) system as an example, the embodiments of the present disclosure may also be applied to other communication systems having a similar technical background or channel form. For example, a fifth-generation mobile communication technology (5G, NR) developed after LTE-A may be included in the communication systems. Also, the embodiments of the present disclosure may also be applied to other communication systems through some modifications within a range that does not largely depart from the scope of the disclosure based on determination of a skilled person.

According to an embodiment, to reduce signaling overhead of a UE capability report in a procedure in which a UE receives a request for a UE capability from a base station and reports the UE capability to the base station, a UE capability report may be replaced using identifier information specified for a UE having the same UE capability. A method according to an embodiment may include a UE identifier access method based on a manufacturer and a UE identifier access method based on a public land mobile network (PLMN). The present disclosure according to an embodiment may provide overall operations for a method of delivering a UE capability using a PLMN-based UE identifier.

When an NR UE is indicated, by a base station, to report a UE capability for multi-radio access technology (RAT) (MR)-dual connectivity (DC), a UE capability report procedure performed by a UE according to an embodiment may be clearly defined. Thus, the UE may accurately deliver its capability and the base station may accurately understand the capability of the UE and provide proper configuration information.

FIG. 1A illustrates a structure of a long term evolution (LTE) system according to an embodiment.

Referring to FIG. 1, a radio access network of the LTE system may include a next-generation base station (an Evolved Node B (eNB), Node B, or base station) 1a-05, 1a-10, 1a-15, and 1a-20, a mobility management entity (MME) 1a-25, and an serving gateway (S-GW) 1a-30. A user equipment (UE or terminal) 1a-35 may connect to an external network through the eNBs 1a-05 through 1a-20 and the S-GW 1a-30.

In FIG. 1A, the eNBs 1a-05 through 1a-20 may correspond to an existing Node B in a Universal Mobile Telecommunication System (UMTS) system. The eNB may be connected with the UE 1a-35 through a radio channel and play more complicated roles than the existing Node B. In the LTE system, every user traffic as well as a real-time service such as Voice over Internet Protocol (VoIP) is provided through a shared channel, requiring a device for collecting state information of UEs, such as a buffer state, an available transmit power state, a channel state, etc., and performing scheduling based on the state information. Examples of such a device may be the eNBs 1a-05 through 1a-20. One eNB may generally control a plurality of cells. For instance, to implement a transmission speed of 100 Mbps, the LTE system may use, for example, orthogonal frequency division multiplexing (OFDM) as a wireless connection scheme in a bandwidth of 20 MHz. Also, adaptive modulation & coding (AMC) may be used in which a modulation scheme and a channel coding rate are determined based on a channel state of a UE. The S-GW 1a-30 may be a device for providing a data bearer, and generate or remove the data bearer under control of the MME 1a-25. The MME 1a-25 may be in charge of various control functions as well as a mobility management function for the UE, and may be connected with the plurality of base stations.

Figure 1B:
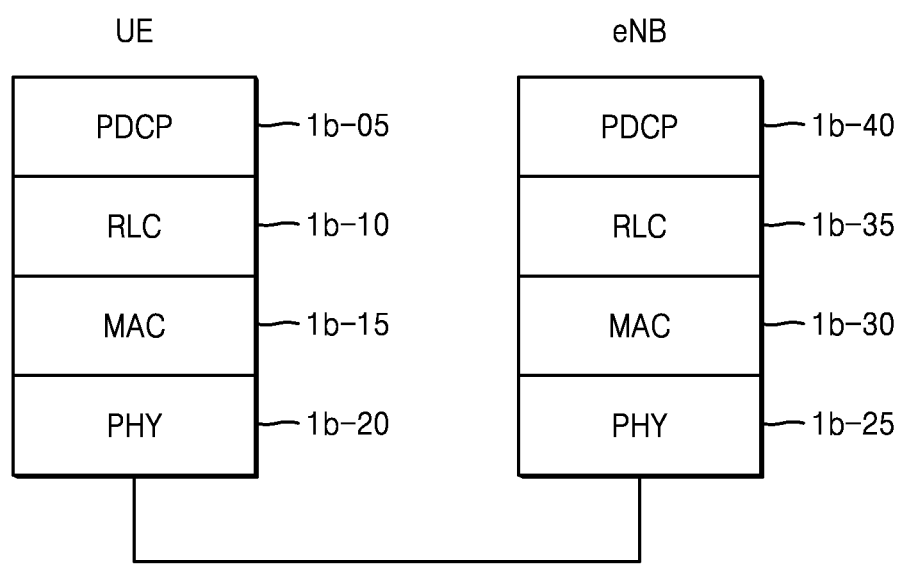
FIG. 1B illustrates a radio protocol architecture in an LTE system according to an embodiment.

FIG. 1B illustrates a radio protocol architecture in an LTE system according to an embodiment.

Referring to FIG. 1B, a radio protocol of the LTE system may include packet data convergence protocols (PDCPs) 1b-05 and 1b-40, radio link controls (RLCs) 1b-10 and 1b-35, and medium access controls (MACs) 1b-15 and 1b-30, respectively, at a UE and an eNB. The PDCPs 1b-05 and 1b-40 may be responsible for IP header compression/decompression or the like. Main functions of the PDCPs may be summarized as follows:

Header compression and decompression (ROHC only)
Transfer of user data
In-sequence delivery of upper-layer PDUs at PDCP re-establishment procedure for RLC AM
For split bearers in DC (only support for RLC acknowledged mode (AM)): PDCP PDU routing for transmission and PDCP PDU reordering for reception
Duplicate detection of lower-layer SDUs at PDCP re-establishment procedure for RLCAM
Retransmission of PDCP SDUs at handover and, for split bearers in DC, of PDCP PDUs at PDCP data-recovery procedure, for RLC AM
Ciphering and deciphering
Timer-based SDU discard in uplink)

The RLCs 1b-10 and 1b-35 may reconstruct a PDCP packet data unit (PDU) into a proper size and perform an automatic repeat request (ARQ) operation. Main functions of the RLCs may be summarized as follows:

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layers $1b$-15 and $1b$-30 may be connected to a plurality of RLC-layer entities configured in one UE, multiplex RLC PDUs into a MAC PDU, and demultiplex an MAC PDU into RLC PDUs. Main functions of the MACs may be summarized as follows:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through hybrid automatic repeat request (HARQ)

Priority handling between logical channels of one UE

Priority handling between UEs by means of dynamic scheduling

MBMS service identification

Transport format selection

Padding

Physical (PHY) layers $1b$-20 and $1b$-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer. For further error correction in a physical layer, HARQ is used, in which a reception end transmits 1 bit as information about whether a packet transmitted from a transmission end has been received. This information may be referred to as HARQ ACK/NACK information. DL HAQR ACK/NACK information for UL transmission may be transmitted through a physical hybrid-ARQ indicator channel (PHICH) physical channel, and UL HARQ ACK/NACK information for DL transmission may be transmitted through a physical uplink control channel (PUCCH) or physical uplink shared channel (PUSCH) physical channel.

Meanwhile, the foregoing PHY layer may include one frequency/carrier or a plurality of frequencies/carriers, and a technique for simultaneously setting the plurality of frequencies to use them may be referred to as carrier aggregation (CA). CA may additionally use a primary carrier and one secondary carrier or a plurality of secondary carriers instead of using one carrier for communication between a terminal (or UE) and a base station (Evolved UMTS Terrestrial Radio Access Network (E-UTRAN) NodeB or eNB). By using CA, the amount of transmission may be innovatively increased as much as the number of secondary carriers. Meanwhile, in LTE, a cell using a primary carrier in a base station may be referred to as a primary cell (PCell) and a cell using a secondary carrier may be referred to as a secondary cell (SCell).

Although not shown, a radio resource control (RRC) layer may exist on packet data convergence protocol (PDCP) layers of the UE and the eNB, respectively, and the RRC layer may exchange a configuration control message related to access or measurement for radio resource control.

Figure 1C:
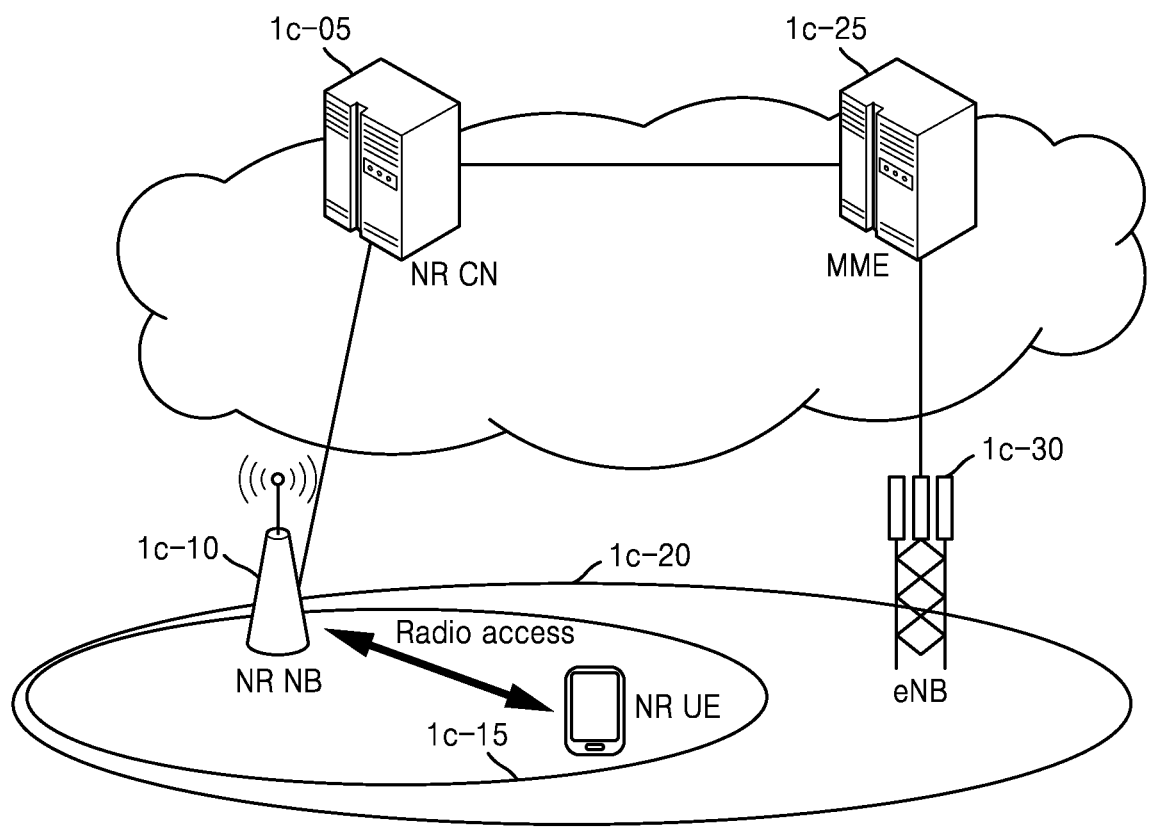
FIG. 1C illustrates a structure of a next-generation mobile communication system according to an embodiment.

FIG. 1C illustrates a structure of a next-generation mobile communication system, e.g., an NR or 5G communication system, according to an embodiment.

Referring to FIG. 1C, as illustrated, a radio access network of the next-generation mobile communication may include an NR NB $1c$-10 and an NR core network (CN) or a next-generation (NG) CN $1c$-05. A new radio user equipment (NR UE or UE) $1c$-15 may access an external network through the NR NB $1c$-10 and the NR CN $1c$-05.

In FIG. 1C, the NR NB $1c$-10 may correspond to an eNB of an existing LTE system. The NR NB $1c$-10 may be connected to the NR UE $1c$-15 over a radio channel and may provide a more advanced service than that of the existing Node B. In the next-generation mobile communication system, all user traffic is served through a shared channel, requiring a device that collects state information, such as UEs' buffer status, available transmission power state, and channel state, and performs scheduling, in which the NR NB $1c$-10 may be responsible for these functions. One NR NB $1c$-10 may generally control a plurality of cells. In a next-generation mobile communication system, a larger bandwidth than an existing maximum bandwidth may be applied to implement ultra-high-speed data transmission when compared to existing LTE. Moreover, a beamforming technique may be further used in addition to OFDM. Also, adaptive modulation & coding (AMC) may be used in which a modulation scheme and a channel coding rate are determined based on a channel state of a UE.

The NR CN $1c$-05 may perform functions such as mobility support, bearer setup, quality of service (QoS) setup, etc. The NR CN $1c$-05 may be a device that performs not only a mobility management function for a UE but also various control functions and may be connected to a plurality of base stations. The next-generation mobile communication system may also interwork with the existing LTE system, in which the NR CN $1c$-05 may be connected to an MME $1c$-25 through a network interface. The MME $1c$-25 may be connected to the eNB $1c$-30, which is an existing base station.

Figure 1D:
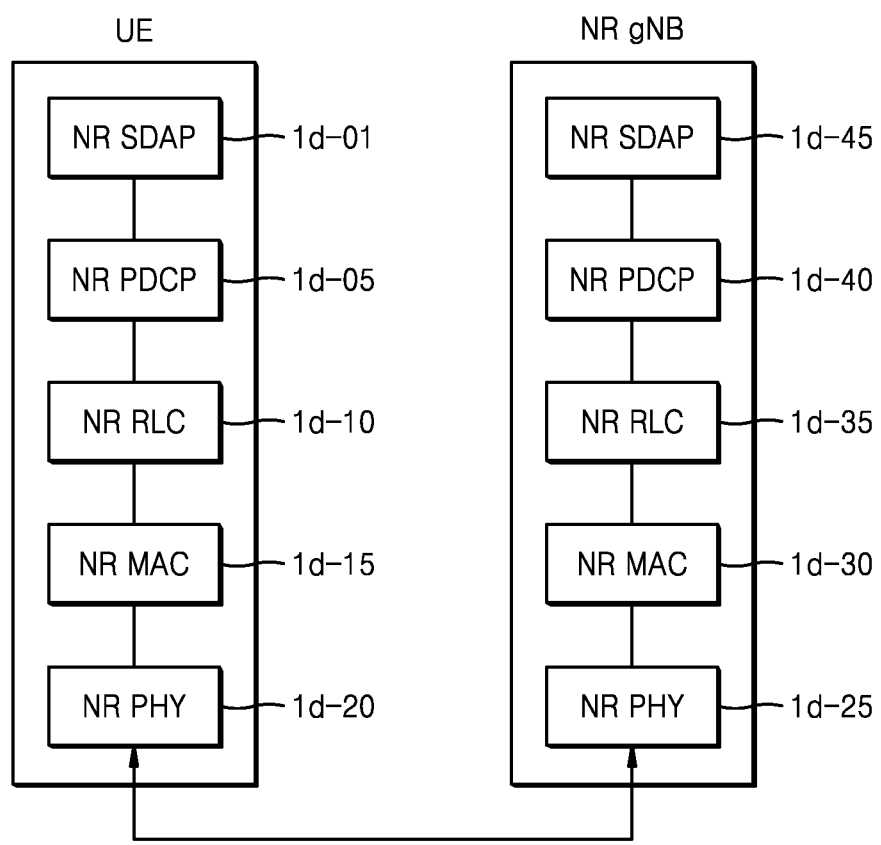
FIG. 1D illustrates a radio protocol architecture of a next-generation mobile communication system according to an embodiment.

FIG. 1D illustrates a radio protocol architecture of a next-generation mobile communication system according to an embodiment.

Referring to FIG. 1D, a radio protocol of the next-generation mobile communication system may include NR service data adaptation protocols (SDAPs) $1d$-01 and $1d$-45, NR PDCPs $1d$-05 and $1d$-40, NR RLCs $1d$-10 and $1d$-35, and NR MACs $1d$-15 and $1d$-30, respectively at a UE and an NR gNB.

Main functions of the NR SDAPs $1d$-01 and $1d$-45 may include some of the following functions:

Transfer of user plane data

Mapping between a QoS flow and a DRB for both DL and UL

Marking QoS flow ID in both DL and UL packets

Reflective QoS flow to DRB mapping for the UL SDAP PDUs

For an SDAP layer entity, a UE may be set whether to use a header of an SDAP layer entity or a function of the SDAP layer entity for each PDCP layer entity or each bearer or logical channel through an RRC message. When an SDAP header is set, it may be indicated using a network attached storage (NAS) QoS reflective configuration 1-bit indicator (NAS reflective QoS) and an AS QoS reflective configuration 1-bit indicator (AS reflective QoS) that the UE may update or reconfigure a QoS flow of an UL and a DL and mapping information regarding a data bearer. The SDAP header may include QoS flow ID information indicating a QoS. The QoS information may be used as data processing priority information, scheduling information, etc., for supporting a smooth service.

Main functions of the NR PDCPs 1d-05 and 1d-40 may include some of the following functions:
- Header compression and decompression (ROHC only)
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink)

In the foregoing description, reordering of an NR PDCP entity may refer to a function of reordering PDCP PDUs received from a lower layer in order based on a PDCP sequence number (SN). The reordering function of the NR PDCP entity may include at least one of delivering data to an upper layer in a reordered order, immediately delivering the data without considering an order, recording lost PDCP PDUs due to reordering, reporting a state of the lost PDCP PDUs to a transmission side, or requesting retransmission of the lost PDCP PDUs.

Main functions of the NR RLCs 1d-10 and 1d-35 may include some of the following functions:
- Transfer of upper layer PDUs
- In-sequence delivery of upper layer PDUs
- Out-of-sequence delivery of upper layer PDUs
- Error correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment In the foregoing description, the in-sequence delivery function of the NR RLC entities may refer to a function of delivering RLC SDUs received from a lower layer to an upper layer in order. When one RLC SDU is received by being divided into several RLC SDUs, in-sequence delivery of the NR RLC entities may include reassembling and delivering the RLC SDUs.

The in-sequence delivery of the NR RLC entities may include at least one of a function of re-assembling and delivering a plurality of RLC SDUs when one original RLCSDU is divided into the plurality of RLC SDUs to be received, a function of rearranging received RLC PDUs based on the RLC SN or the PDCP SN, a function of recording lost RLC PDUs through reordering, a function of reporting the state of lost RLC PDUs to a transmitter, a function of requesting retransmission of lost RLC PDUs, a function of delivering only RLC SDUs before a lost RLC SDU to an upper layer in order in case of the presence of the lost RLC SDU, a function of delivering all RLC SDUs, received before a timer starts, to an upper layer in order when the timer has expired despite the presence of a lost RLC SDU, or a function of delivering all RLC SDUs received so far to an upper layer in order when the timer expires despite the presence of a lost RLC SDU.

The NR RLC entities may process RLC PDUs in an order they are received (in the order of arrival regardless of an order of a serial number or a sequence number) and may deliver them to the PDCP entity regardless of an order (out-of sequence delivery). When the NR RLC entities receive a segment, the NR RLC entities may receive segments stored in a buffer or to be received later and reconfigure them into one complete RLC PDU, and then process and deliver the RLC PDU to the PDCP entity. The NR RLC layers may not include a concatenation function, and the concatenation function may be performed in the NR MAC layers or may be replaced with a multiplexing function of the NR MAC layers.

In the foregoing description, the out-of-sequence delivery of the NR RLC entities may refer to a function of immediately delivering RLC SDUs received from a lower layer to an upper layer regardless of an order. The out-of-sequence delivery function may include a function of re-assembling and delivering a plurality of RLC SDUs when one original RLC SDU is divided into the plurality of RLC SDUs to be received, and a function of recording lost RLC PDUs by storing and reordering the RLC SNs or PDCP SNs of received RLC PDUs.

The NR MACs 1d-15 and 1d-30 may be connected to a plurality of NR RLC-layer entities configured in one UE, and main functions of the NR MACs may include some of the following functions:
- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding NR PHY layers 1d-20 and 1d-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

Figure 1E:
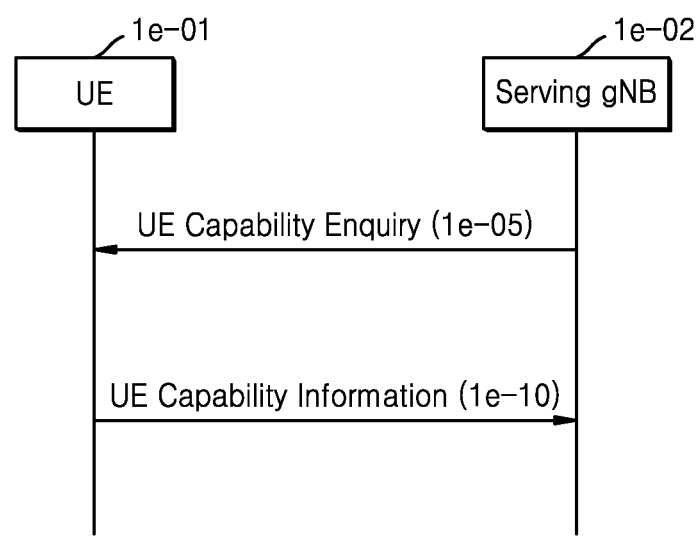
FIG. 1E illustrates a message structure for supporting a user equipment (UE) capability in a new radio (NR) or $5^{th}$-generation (5G) communication system according to an embodiment.

FIG. 1E illustrates a message structure for reporting a UE capability in an NR or 5G communication system according to an embodiment.

A UE 1e-01 may have a procedure for reporting a capability supported by the UE 1e-01 to a serving gNB 1e-02 when the UE 1e-01 is connected with the serving gNB 1e-02.

In operation 1e-05, the serving gNB 1e-02 may deliver a UE capability enquiry message requesting a capability report to the connected UE 1e-01. The foregoing UE capability enquiry message may include a RAT type-based UE capability request of the serving gNB 1e-02. The RAT type-based request may include requesting frequency band information according to a priority.

The above-described UE capability enquiry message may request a plurality of RAT types in one RRC message container. Meanwhile, the serving gNB 1e-02 may deliver the UE capability enquiry message including the RAT type-based request to the UE 1e-01 a plurality of times. That is, the UE capability enquiry in operation 1e-05 may be repeated several times, and the UE 1e-01 may configure a UE capability information message by matching responses to the repeated UE capability enquiries and report the configured UE capability information message. In the next-generation mobile communication system, a UE capability request for MR-DC as well as NR, LTE, and E-UTRAN NR-DC (EN-DC) may be possible. In an embodiment, the above-described UE capability enquiry message may be generally transmitted at an initial stage after a UE performs connection, but the UE capability may be requested under a certain condition when needed by the base station.

The UE 1e-01 having received a UE capability report request from the serving gNB 1e-02 may configure the UE capability based on a RAT type and frequency band information requested from the serving gNB 1e-02. Hereinbelow, a method, performed by the UE 1e-01, of configuring a UE capability in an NR system according to an embodiment will be described.

The UE may be requested to provide some or all of LTE, EN-DC, and NR as a RAT type and at the same time, may be provided with a list for LTE and NR frequency bands, through the UE capability request from the base station. In an embodiment, the UE may configure a band combination (BC) for EN-DC and NR standalone (SA). That is, the UE may configure a candidate BC list for EN-DC and NR SA, based on frequency bands requested from the base station through FreqBandList. The foregoing operation may be defined as an operation of compiling a candidate band combination. A band priority may be based on an order described in FreqBandList. In an embodiment, the foregoing operation may be performed once regardless of a RAT type or may be repeated for each RAT Type.

In the following embodiment, a corresponding procedure may be performed for each RAT type, based on a priority of NR, MR-DC, and then LTE.

When an "eutra-nr-only" flag or an "eutra" flag is set in a RAT type of the UE capability request message, NR SA BCs may be completely removed from the configured candidate BC list. In an embodiment, the foregoing operation may be performed when an LTE eNB requests an "eutra" capability.

Thereafter, the UE may remove fallback BCs from the configured candidate BC list. Herein, a fallback BC may correspond to a case where a band corresponding to a minimum of one SCell is removed from a certain super set BC. The super set BC may be able to cover the fallback BC, such that the fallback BC may be omitted. This operation may also be applied in the EN-DC, i.e., LTE bands. The BC remaining after this operation may be a final "candidate BC list".

The UE may select BCs to be reported by selecting BCs suitable for the requested RAT type from the final "candidate BC list". In this step, the UE may configure supportedBandCombinationList in a determined order. That is, the UE may configure a BC to be reported and a UE capability according to a preset RAT-type order. (nr→eutra-nr→eutra).

The UE may configure featureSetCombination for configured supportedBandCombinationList and may configure a list of "candidate feature set combinations" in the candidate BC list from which a list of fallback BCs (having capabilities of the same or lower level) is removed. In an embodiment, the "candidate feature set combination" may include all feature set combinations for NR and EUTRA-NR BCs and may be obtained from a feature set combination of UE-NR-Capabilities and a UE-MRDC-Capabilities container.

When the requested RAT type is an EUTRA-NR and has an influence upon supportedBandCombination of an EN-DC or an MR-DC, featureSetCombinations may be configured according to a corresponding RAT type and may be included in two containers of UE-MRDC-Capabilities and UE-NR-Capabilities. However, a feature set of NR may include UE-NR-Capabilities alone.

After the UE capability is configured, the UE 1e-01 may deliver the UE capability information message including the UE capability to the serving gNB 1e-02, in operation 1e-10. The serving gNB 1e-02 may perform proper scheduling and transmission/reception management on the UE 1e-01 based on the UE capability received from the UE 1e-01.

In an embodiment, in a way to reduce the complexity of an existing procedure for requesting and reporting a UE capability applied to an NR system, a method of substituting for a UE capability report through an identifier (ID) representing the UE capability may be considered. Generally, the UE may configure the same UE capability according to a model specified by a manufacturing number or a manufacturer of the UE. In addition, when the base station and the core network have the capability of the UE, they may store and use it. When the same UE capability is reported in the same UE model, the base station and the core network may receive the same UE capability report for the UE model at all times, thus performing optimization for a corresponding operation. That is, when an identifier representing a capability of a corresponding UE model exists and a UE may report the identifier, the base station and the core network may determine the identifier and retrieve the UE capability. In an embodiment, there are two options to use the identify representing the UE capability.

Manufacturer-based UE capability ID: there may be an identifier for each manufacturer and each UE model (or UEs having the same UE capability among manufacturer UEs), which may be an identifier uniquely representing a radio link UE capability of the UE.

PLMN-based UE capability ID: when the manufacturer-based UE capability ID is not provided or the base station and the core network may not be able to identify the manufacturer-based UE capability ID, an identifier substituting for the manufacturer-based UE capability ID is needed, such that the base station and the core network may provide a specific identifier to the UE according to the UE capability. The identifier may need to be applicable to a serving PLMN, and may be assigned PLMN-specifically.

In the present disclosure according to an embodiment, in a UE capability report operation using the foregoing two identifiers, an operation of providing the PLMN-based UE capability ID and identifying the UE capability by analyzing the PLMN-based UE capability ID may be proposed.

Figure 1F:
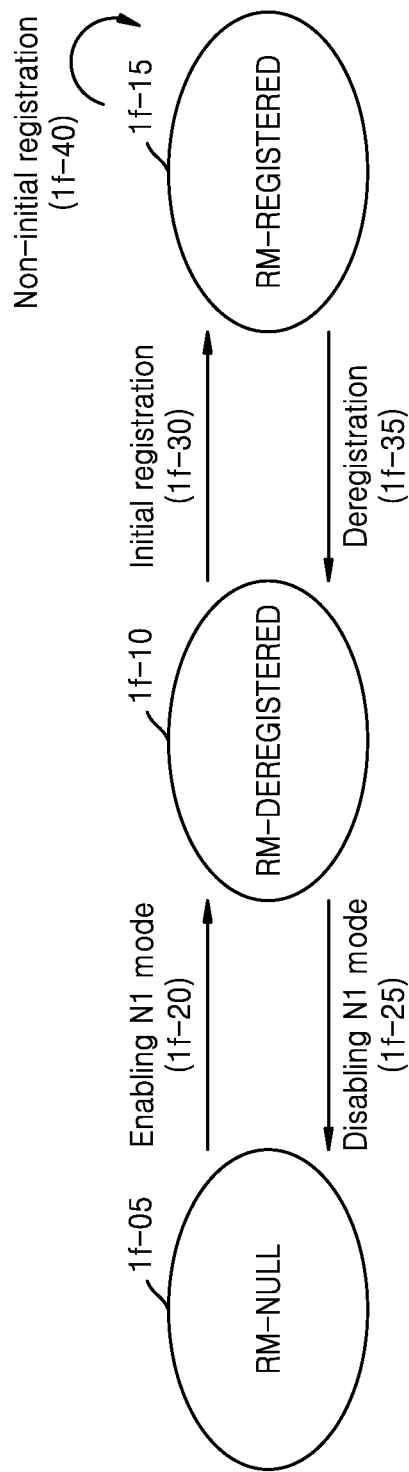
FIG. 1F is a view for describing a state in which a UE registers or deregisters in a 5G core network in an NR or 5G communication system according to an embodiment.

FIG. 1F is a view for describing a state in which a UE registers or deregisters in a 5G core network in an NR or 5G communication system according to an embodiment.

In operation 1f-05, until the UE initially registers in a core network in an NR system, the UE may be in a registration management (RM)-NULL state with the core network (a certain entity of a base station or the core network).

Thereafter, when the UE is enabled in an N1 mode (a mode to connect to a 5G core network) in operation 1f-20, the UE may exist in an RM-DERESTERED state for the 5G core network as in operation 1f-10. That is, it may mean that the UE may connect to the 5G core network, but has not yet completed connection and registration.

In operation 1f-30, the UE may attempt initial connection and registration with the 5G core network. Upon completion of the foregoing operation, the UE may switch to the RM-REGISTERED state of operation 1f-15.

Thereafter, in operation 1f-40, even when the UE performs a procedure such as serving cell change, etc., the UE may maintain the RM-REGISTERED state because this operation is not an initial registration operation.

In operation 1f-35, when the UE is deregistered, the UE may switch back to the RM-DEREGISTERED state.

In operation 1f-25, when N1 mode disabling is applied in this state, the UE may switch back to the RM-NULL state.

Figure 1G:
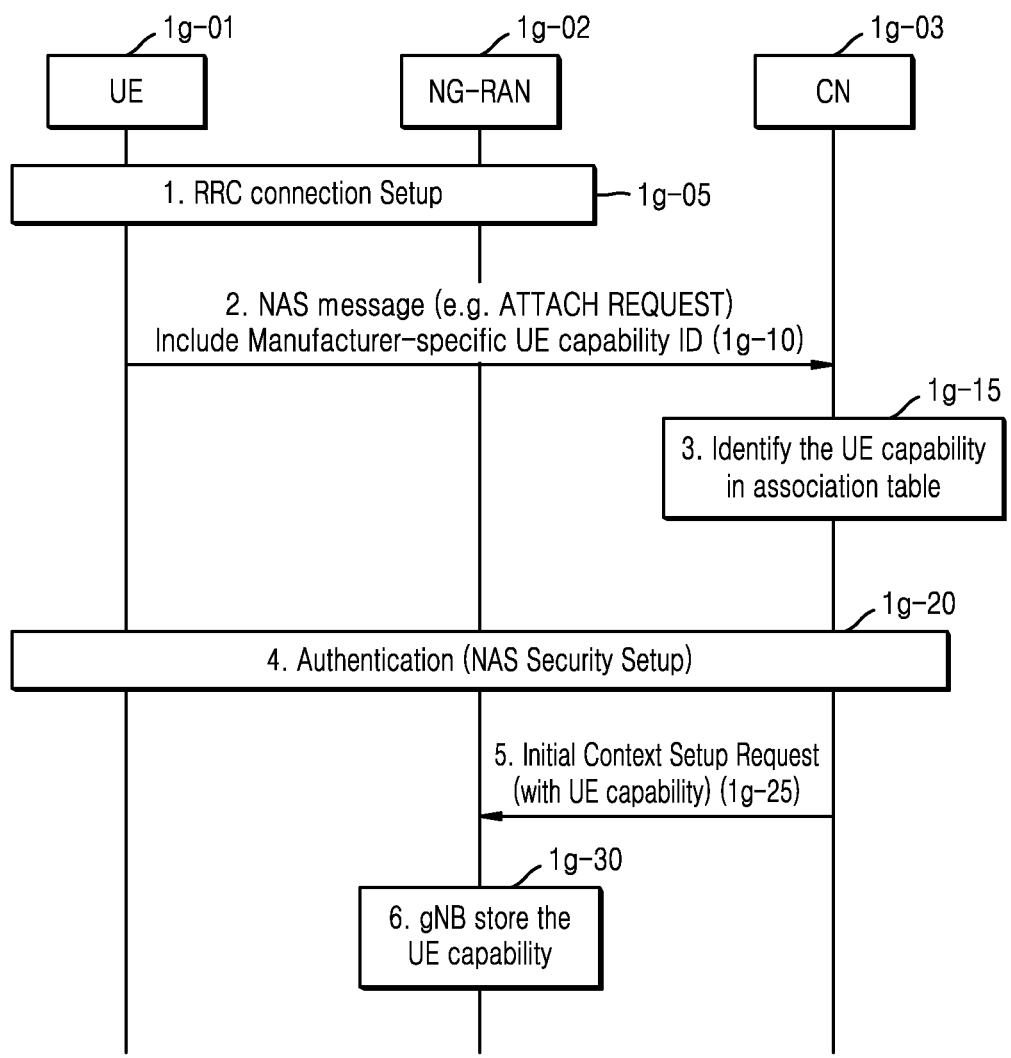
FIG. 1G is a view for describing an operation of identifying a UE capability according to an embodiment.

FIG. 1G is a view for describing an operation of identifying a UE capability according to an embodiment. More specifically, FIG. 1G is a view for describing an operation of identifying a UE capability by using a manufacturer-based UE capability ID, according to an embodiment.

In operation 1g-05, a UE 1g-01 in an RRC IDLE state may perform an RRC connection procedure with a certain NR gNB 1g-02.

In operation 1g-10, after the UE 1g-01 performs the RRC connection procedure, the UE 1g-01 may deliver an NAS message (e.g., ATTACH REQUEST) including a manufacturer-based UE capability ID to a core network (CN) 1g-03 to which the corresponding base station is connected.

In operation 1g-15, the CN 1g-03 having received the NAS message may identify the manufacturer-based UE capability ID to determine whether a UE capability corresponding to the identifier is stored, and identify the UE capability mapped to the identifier. For the foregoing operation, in the CN 1g-03, manufacturer-based UE capability IDs and UE capabilities may exist in the form of a mapping table.

In operation 1g-20, the UE 1g-01 and the CN 1g-03 may perform a procedure for setting up NAS security (authentication).

In operation 1g-25, the CN 1g-03 may deliver the UE capability, known as a result of identifying the manufacturer-based UE capability ID in operation 1g-15, to the gNB 1g-02. The foregoing message may be included in an INITIAL CONTEXT SETUP REQUEST (NAS message). In the foregoing operation, the CN 1g-03 may deliver the manufacturer-based UE capability ID received from the UE 1g-01, together.

In operation 1g-30, the gNB 1g-02 may store the UE capability received from the CN 1g-03. The gNB 1g-02 may also reflect the UE capability described in RRC setup with the UE 1g-01. The gNB 1g-02 may become aware of the UE capability through the foregoing procedure, and thus may not trigger an operation of requesting the UE capability from the UE.

Figure 1H:
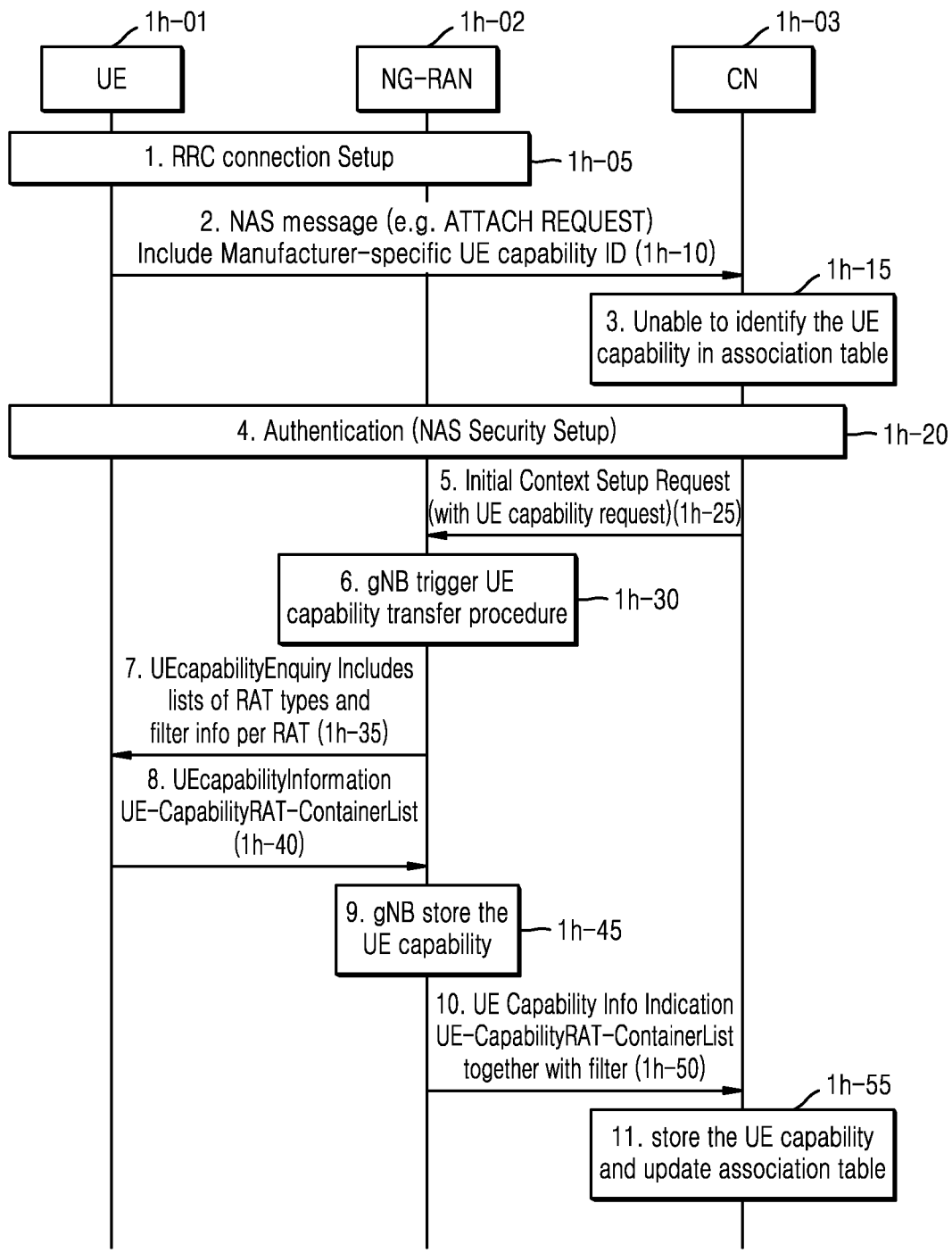
FIG. 1H is a view for describing an operation when identification of a UE capability fails, according to an embodiment.

FIG. 1H is a view for describing an operation when identification of a UE capability fails, according to an embodiment. More specifically, FIG. 1GH is a view for describing an operation when a UE capability fails to be identified by using a manufacturer-based UE capability ID, according to an embodiment.

In operation 1h-05, a UE 1h-01 in the RRC IDLE state may perform an RRC connection procedure with a certain NR gNB 1h-02.

In operation 1h-10, after the UE 1h-01 performs the RRC connection procedure, the UE 1g-01 may deliver an NAS message (e.g., ATTACH REQUEST) including a manufacturer-based UE capability ID to a CN 1h-03 to which the corresponding base station is connected.

In operation 1h-15, the CN 1h-03 having received the NAS message may identify the manufacturer-based UE capability ID to determine whether a UE capability corresponding to the identifier is stored. In this case, the CN 1h-03 may not fail to recover the UE capability mapped to the identifier. For the foregoing operation, in the CN, manufacturer-based UE capability IDs and UE capabilities may exist in the form of a mapping table. However, in this process, the manufacturer-based UE capability ID provided by the UE may not be stored in the CN 1h-03, or the CN 1h-03 may not understand the manufacturer-based UE capability ID.

In operation 1h-20, the UE 1h-01 and the CN 1h-03 may perform a procedure for setting up NAS security (authentication).

In operation 1h-25, the CN 1h-03 may notify to the gNB 1h-02 that the CN 1h-03 does not have the UE capability of the UE 1h-01, and deliver an INITIAL CONTEXT SETUP REQUEST message (NAS message) requesting the UE capability to the gNB 1h-02. In the foregoing operation, the CN 1h-03 may deliver the manufacturer-based UE capability ID received from the UE 1h-01, together. In the foregoing operation, the gNB 1h-02 may identify the manufacturer-based UE capability ID received from the CN 1h-03, and when the gNB 1h-02 has UE capability information corresponding to the identifier and thus the UE capability may be recovered, the gNB 1h-02 may notify the CN 1h-03 of so. Thereafter, a UE capability request procedure may be omitted.

In operation 1h-30, the gNB 1h-02 may identify the UE capability request received from the CN 1h-03 and trigger the UE capability request.

That is, in operation 1h-35, the gNB 1h-02 may deliver a UE capability request message (UECapabilityEnquiry) including a RAT type requesting a UE capability and filtering information to the UE 1h-01.

In operation 1h-40, the UE 1h-01 may configure the UE configure by reflecting the RAT type and the filtering information in response to the UE capability request message received in operation 1h-35, and deliver a UE capability information message (UECapabilityInformation) to the gNB 1h-02. In the foregoing operation, the UE 1h-01 may include the manufacturer-based UE capability ID in the UECapabilityInformation message.

In operation 1h-45, the gNB 1h-02 may store the UE capability information received from the UE 1h-01. When the manufacturer-based UE capability ID is received together from the UE 1h-01, the gNB 1h-02 may store the corresponding information together.

In operation 1h-50, the gNB 1h-02 may store the UECapabilityInformation message received from the UE 1h-01 and deliver the same to the CN 1h-03. The UE capability may be carried through a different container for a different RAT type, including the filtering information.

In operation 1h-55, the CN 1h-03 may store the received UE capability and update a UE capability mapping table including manufacturer-based UE capability IDs and UE capabilities. Thereafter, for a UE providing a manufacturer-based UE capability ID, a stored UE capability may be applied.

Figure 1I:
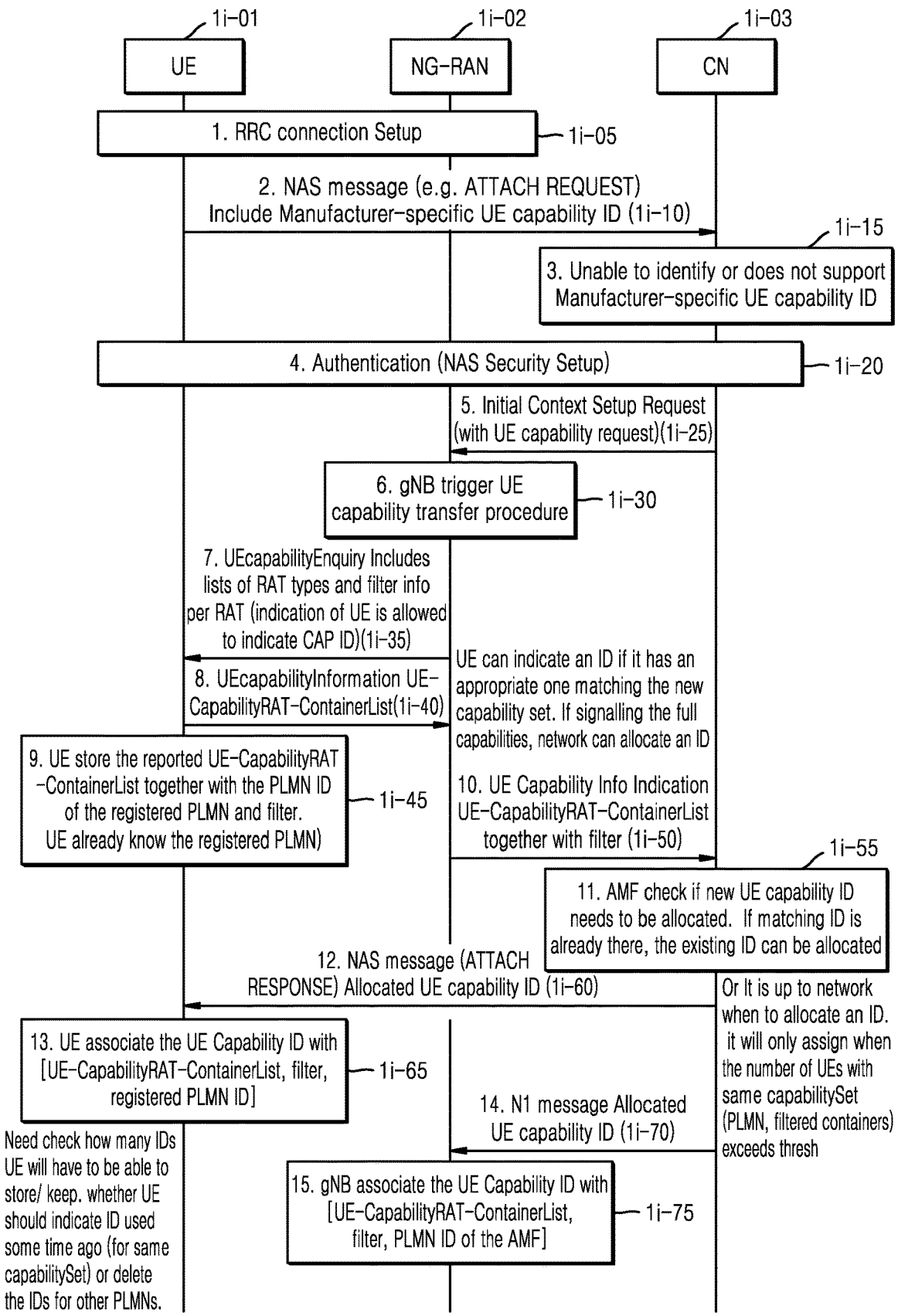
FIG. 1I is a view for describing an operation of providing and applying a public land mobile network (PLMN)-based UE capability identifier, according to an embodiment.

FIG. 1I is a view for describing an operation of providing and applying a PLMN-based UE capability identifier, according to an embodiment. More specifically, FIG. 1I is a view for describing an operation of being provided with a PLMN-based UE capability ID and applying the same, according to an embodiment.

In operation 1i-05, a UE 1i-01 in the RRC IDLE state may perform an RRC connection procedure with a certain NR gNB 1i-02.

In operation 1i-10, after the UE 1i-01 performs the RRC connection procedure, the UE 1g-01 may deliver an NAS message (e.g., ATTACH REQUEST) including a manufacturer-based UE capability ID to a CN 1i-03 to which the corresponding base station is connected.

In operation 1i-15, the CN 1i-03 having received the NAS message may identify the manufacturer-based UE capability ID to determine whether a UE capability corresponding to the identifier is stored. In this case, the CN 1*i*-03 may not fail to recover the UE capability mapped to the identifier. For the foregoing operation, in the CN, manufacturer-based UE capability IDs and UE capabilities may exist in the form of a mapping table. However, in this process, the manufacturer-based UE capability ID provided by the UE may not be stored in the CN 1*i*-03, or the CN 1*i*-03 may not understand the manufacturer-based UE capability ID.

In operation 1*i*-20, the UE 1*i*-01 and the CN 1*i*-03 may perform a procedure for setting up NAS security (authentication).

In operation 1*i*-25, the CN 1*i*-03 may notify to the gNB 1*i*-02 that the CN 1*i*-03 does not have the UE capability of the UE 1*i*-01, and deliver an INITIAL CONTEXT SETUP REQUEST message (NAS message) requesting the UE capability to the gNB 1*h*-02. In the foregoing operation, the CN 1*i*-03 may deliver the manufacturer-based UE capability ID received from the UE 1*i*-01, together. In the foregoing operation, the gNB 1*i*-02 may identify the manufacturer-based UE capability ID received from the CN 1*i*-03, and when the gNB 1*i*-02 has UE capability information corresponding to the identifier and thus the UE capability may be recovered, the gNB 1*i*-02 may notify the CN 1*h*-03 (a certain entity of the CN) of so, and omit a subsequent UE capability request procedure.

In operation 1*i*-30, the gNB 1*i*-012 may identify the UE capability request received from the CN 1*i*-03 and trigger the UE capability request.

That is, in operation 1*i*-35, the gNB 1*i*-02 may deliver a UE capability request message (UECapabilityEnquiry) including a RAT type requesting a UE capability and filtering information to the UE 1*i*-01. The RRC message may also include an indicator indicating whether the UE is capable of providing the UE capability ID.

In operation 1*i*-40, when the NG gNB 1*i*-02 has received an indicator indicating whether the UE 1*i*-10 is capable of providing the UE capability ID (or an indicator indicating the manufacturer-based UE capability ID is not valid) and has the PLMN-based UE capability ID mapped to the UE capability request including the RAT type and the filtering information, the UE 1*i*-01 may deliver the UE capability information message (UECapabilityInformation) including the corresponding identifier to the gNB. However, when the UE 1*i*-01 does not have the PLMN-based UE capability ID mapped to the request of the gNB 1*i*-02, the UE 1*i*-01 may configure the UE capability by reflecting the RAT type and the filtering information like in an existing UE capability report procedure and deliver the UE capability information message (UECapabilityInformation) to the gNB in operation 1*i*-40.

The operation initiated subsequently may be a procedure corresponding to a case where the UE reports a UE capability because the UE does not have the mapped PLMN-based UE capability ID in operation 1*i*-40.

In operation 1*i*-45, the UE 1*i*-01 may come to know that the gNB 1*i*-02 does not have the UE capability corresponding to the manufacturer-based UE capability ID provided by the UE 1*i*-01 in the foregoing operation, and may come to know that the UE 1*i*-01 may receive the PLMN-based UE capability ID mapped to the UE capability delivered to the gNB 1*i*-02 because the UE 1*i*-01 has transmitted the UE capability thereof to the gNB 1*i*-02. Thus, in the corresponding operation, the UE 1*i*-01 may store the UE capability information delivered in operation 1*i*-40 in an internal buffer (memory) of the UE 1*i*-01, and store the RAT type and the filtering information related to the UE capability information, which are requested by the gNB 1*i*-02. Moreover, the UE may store registered PLMN information of a connected serving cell from system information SIB1 received from a corresponding serving cell. In conclusion, the UE 1*i*-01 may store PLMN information, RAT type and filtering information, and reported UE capability as one group in operation 1*i*-45.

In operation 1*i*-50, the gNB 1*i*-02 may store the UECapabilityInformation message received from the UE 1*i*-01 and deliver the same to the CN 1*i*-03. The UE capability may be carried through a different container for a different RAT type, including the filtering information.

In operation 1*i*-55, the CN 1*i*-03 may identify the received UE capability in the foregoing operation. When the PLMN-based UE capability ID mapped to the UE capability reported by the UE 1*i*-01 for the filtering information and the requested RAT type exists in the stored table, the CN 1*i*-03 may assign the corresponding identifier as the PLMN-based UE capability ID. However, when the reported UE capability is a new one that the CN does not have, the CN 1*i*-03 may assign a new PLMN-based UE capability ID.

In operation 1*i*-60, the CN 1*i*-03 may deliver a PLMN-based UE capability ID assigned corresponding to a UE capability reported by the UE 1*i*-02 to the UE 1*i*-01 through an NAS message (e.g., ATTACH RESPONSE). The foregoing message may include index information for indicating a UE capability indicated by the identifier or RAT type and filtering information mapped to the UE capability.

A reason why the corresponding operation is required is because operation 1*i*-35 and operation 1*i*-40 may be consecutively performed instead of being performed once. For example, according to an embodiment, the gNB 1*i*-02 may deliver an NR UE capability request including RAT type and filtering information to the UE 1*i*-01 in operation 1*i*-35, and receive a corresponding UE capability from the UE 1*i*-01 in operation 1*i*-40, and then repeat operation 1*i*-35 once again to request an EN-DC UE capability and receive a UE capability report corresponding to operation 1*i*-40. In this case, the gNB 1*i*-20 may have to separately assign PLMN-based UE capability IDs for two consecutively received UE capabilities, such that index information for distinguishing the UE capabilities (for example, the first UE capability report may be set to 1 and the second UE capability report may be set to 2) may be included or filtering information may be delivered together.

In operation 1*i*-55, a method, performed by the CN 1*i*-03, of assigning a PLMN-based UE capability ID may apply different operations according to network implementation. For example, in an embodiment, a UE capability report may be received for a certain UE, and when the number of UE reports providing the same UE capability as the corresponding UE capability is greater than a predetermined threshold value N, the corresponding UE capability may be specified and the PLMN-based UE capability ID may be assigned. That is, an algorithm may be required in which a certain PLMN-based UE capability ID is not assigned merely with several UE capability reports.

In operation 1*i*-65, the UE 1*i*-01 may map the PLMN-based UE capability ID received from the CN 1*i*-03 in operation 1*i*-60 to a UE capability storage group reported and stored by the UE 1*i*-01 in operation 1*i*-45 and newly store them. That is, the UE 1*i*-01 may store a PLMN-based UE capability ID, registration PLMN information, RAT type and filtering information, and a reported UE capability in one group and then use a PLMN-based UE capability ID assigned to represent the UE capability. In addition, in the foregoing operation, the number of PLMN-based UE capability IDs the UE 1i-01 may store in the foregoing operation may be limited. When the UE 1i-01 needs to store a UE capability for a new PLMN-based UE capability ID while storing a set number of PLMN-based UE capability IDs, the previously stored PLMN-based UE capability IDs and the corresponding UE capability group may be deleted and update with a new value may be performed. In the foregoing operation, information for the same PLMN may be left and information for a different PLMN may be deleted.

In operation 1i-70, the CN 1i-03 may deliver the PLMN-based UE capability ID delivered to the UE to the gNB 1i-02 through an N1 message.

In operation 1i-75, the gNB 1i-02 may store the PLMN-based UE capability ID, the registration PLMN information, the RAT type and the filtering information, and the reported UE capability as one group, based on the received PLMN-based UE capability ID, the UE capability received in operation 1i-40, and the RAT type and the filtering information delivered to the UE 1i-01 in operation 1i-35. Thereafter, when the UE 1i-01 uses the PLMN-based UE capability ID assigned to represent the UE capability, the gNB 1i-02 having received the PLMN-based UE capability ID may not trigger the UE capability request.

Figure 1J:
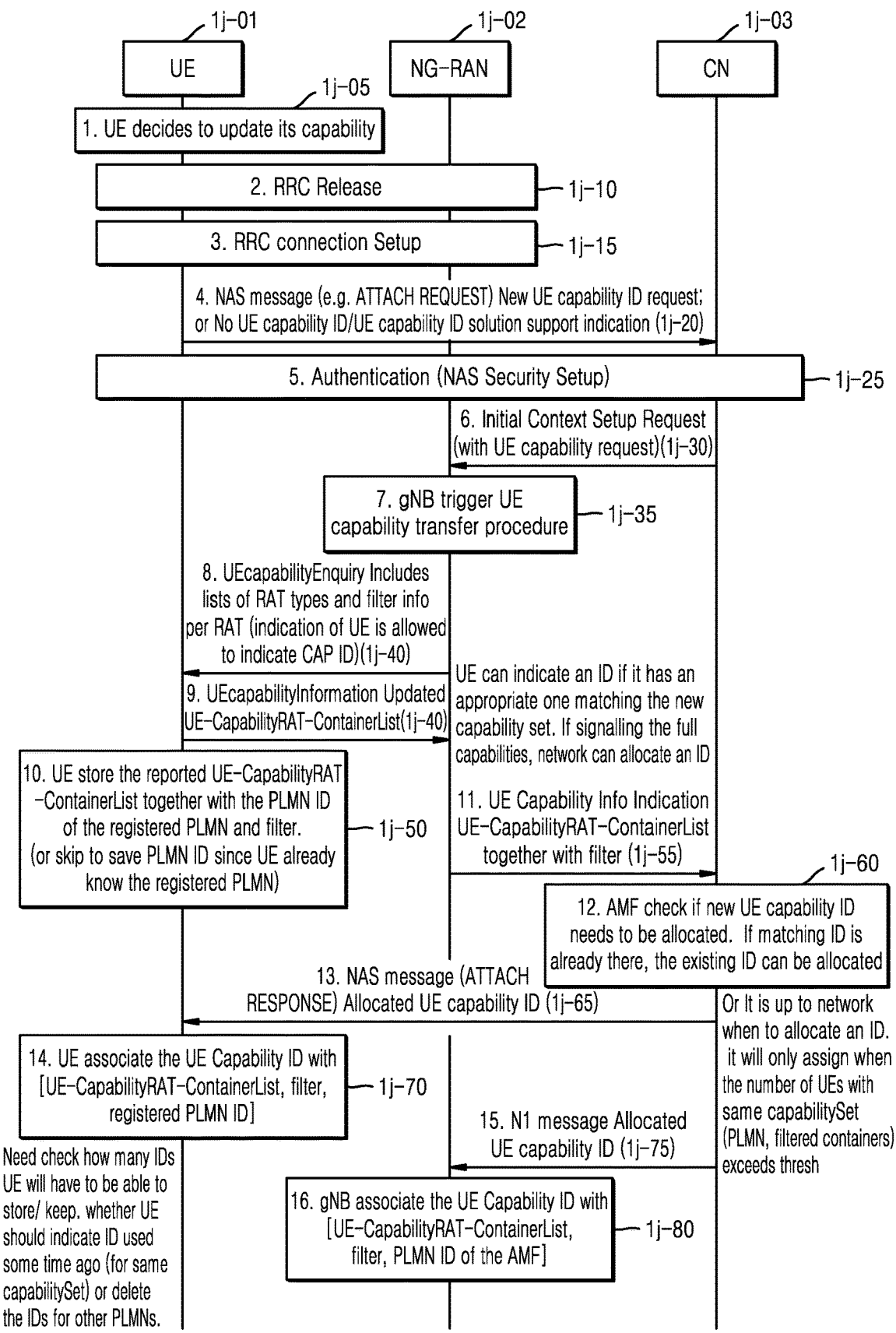
FIG. 1J is a view for describing an operation of updating a PLMN-based UE capability identifier, according to an embodiment.

FIG. 1J is a view for describing an operation of updating a PLMN-based UE capability identifier, according to an embodiment. More specifically, FIG. 1J is a view for describing an overall operation of updating a PLMN-based UE capability ID due to a UE change, when the PLMN-based UE capability ID is applied, according to an embodiment.

The embodiment to be described with reference to FIG. 1J may be based on the embodiment described with reference to FIG. 1I. When the UE is assigned with the PLMN-based UE capability ID after the UE finishes the procedure of FIG. 1i, the UE capability corresponding to the PLMN-based UE capability ID may be changed in a certain context and thus the PLMN-based UE capability ID may have to be updated. The embodiment to be described with reference to FIG. 1J is intended to describe and define the overall operations of the UE, the gNB, and the CN in this case. As examples of the foregoing case, there may be universal subscriber identification module (USIM) replacement of the UE, change of the UE, a temporary UE capability change (e.g., UE heat emission, interference with other wireless functions (e.g., WiFi, Bluetooth, etc.), and the like. As such, when compared to the UE capability reported already by the UE, the UE capability may be changed, and this may mean that the assigned PLMN-based UE capability ID does not work any longer. In this case, the UE may perform the following procedure to be assigned with a new PLMN-based UE capability ID corresponding to the changed UE capability.

In operation 1j-05, the UE 1j-01 in an RRC connected state may trigger a procedure for updating a PLMN-based UE capability ID so as to be assigned with a new PLMN-based UE capability ID corresponding to a UE capability change as described above.

In operation 1j-10, the UE 1j-01 may perform an RRC Release procedure with a connected NR gNB 1j-02. The foregoing operation may be performed by including a certain cause value in a message for requesting RRCRelease by the UE. Alternatively, in the foregoing operation, the UE 1j-01 may deliver DETACH REQUEST to the CN 1j-03 to disconnect from the CN 1j-03.

In operation 1j-15, the UE 1j-01 may perform cell (re) selection to perform connection with a certain cell.

In operation 1j-20, after the UE 1j-01 performs the RRC connection procedure, the UE 1g-01 may deliver an NAS message (e.g., ATTACH REQUEST) including a manufacturer-based UE capability ID or including a parameter requesting a new PLMN-based UE capability ID (or an indicator indicating absence or invalidity of the UE capability ID), to the CN 1j-03 to which the corresponding base station is connected.

In operation 1j-25, the CN 1j-03 having received the NAS message may perform a procedure for setting up NAS security (authentication).

In operation 1j-30, the CN 1j-03 may notify to the gNB 1j-02 that the CN 1j-03 does not have the UE capability of the UE 1j-01, and deliver an INITIAL CONTEXT SETUP REQUEST message (NAS message) requesting the UE capability to the gNB 1h-02. In the foregoing operation, when the CN 1j-03 has the manufacturer-based UE capability ID received from the UE 1j-01, the CN 1j-03 may deliver the manufacturer-based UE capability ID, together. In the foregoing operation, the gNB 1j-02 may identify the manufacturer-based UE capability ID received from the CN 1j-03, and when the gNB 1h-02 has UE capability information corresponding to the identifier and thus the UE capability may be recovered, the gNB 1j-02 may notify the CN 1h-03 of so. Thereafter, a UE capability request procedure may be omitted.

In operation 1j-35, the gNB 1j-02 may identify the UE capability request received from the CN 1j-03 and trigger the UE capability request.

That is, in operation 1j-40, the gNB 1j-02 may deliver a UE capability request message (UECapabilityEnquiry) including a RAT type requesting a UE capability and filtering information to the UE 1j-01. The RRC message may also include an indicator indicating whether the UE 1j-01 is capable of providing the UE capability ID.

In operation 1j-45, when the NG gNB 1j-02 has received an indicator indicating whether the UE 1j-01 is capable of providing the UE capability ID (or an indicator indicating the manufacturer-based UE capability ID is not valid) and has the PLMN-based UE capability ID corresponding to the UE capability request including the RAT type and the filtering information, the UE 1j-01 may deliver the UE capability information message (UECapabilityInformation) including the corresponding identifier to the gNB 1j-02. However, when the UE 1j-01 does not have the PLMN-based UE capability ID corresponding to the request of the gNB 1j-02, the UE 1j-01 may configure the UE capability by reflecting the RAT type and the filtering information like in an existing UE capability report procedure and deliver the UE capability information message (UECapabilityInformation) to the gNB 1j-02 in operation 1j-45.

The following embodiment may be an embodiment for a procedure corresponding to a case where the UE 1j-01 reports a UE capability because the UE 1j-01 does not have the corresponding PLMN-based UE capability ID in operation 1j-45.

In operation 1j-50, the UE 1j-01 may come to know that the gNB 1j-02 does not have the UE capability corresponding to the manufacturer-based UE capability ID provided by the UE 1j-01. The UE 1j-01 may come to know that the UE 1j-01 may receive the PLMN-based UE capability ID corresponding to the UE capability delivered to the gNB 1j-02 because the UE 1j-01 has delivered the UE capability thereof to the gNB 1j-02. Thus, in the corresponding operation, the UE 1j-01 may store the UE capability information delivered in operation 1j-45 in an internal buffer (memory) of the UE 1i-01, and store the RAT type and the filtering information related to the UE capability information, which are requested by the gNB 1i-02. Moreover, the UE 1j-01 may store registered PLMN information of a connected serving cell from system information SIB1 received from a corresponding serving cell. In conclusion, the UE 1j-01 may store PLMN information, RAT type and filtering information, and reported UE capability as one group in operation 1j-50.

In operation 1j-55, the gNB 1j-02 may deliver the UECapabilityInformation message received from the UE 1j-01 to the CN 1j-03, and the corresponding UE capability may be carried through a different container for a different RAT type, including the filtering information.

In operation 1j-60, the CN 1j-03 may identify the UE capability received in the foregoing operation, and when the PLMN-based UE capability ID corresponding to the UE capability reported by the UE 1j-01 for the filtering information and the requested RAT type exists in the stored table, the CN 1j-03 may assign the corresponding identifier as the PLMN-based UE capability ID. However, when the reported UE capability is a new one that the CN 1j-03 does not have, the CN 1j-03 may assign a new PLMN-based UE capability ID.

In operation 1j-65, the CN 1j-03 may deliver a PLMN-based UE capability ID assigned corresponding to a UE capability reported by the UE 1j-02 to the UE 1j-01 through an NAS message (e.g., ATTACH RESPONSE). The foregoing message may include index information for indicating a UE capability indicated by the identifier or RAT type and filtering information corresponding to the UE capability.

A reason why the corresponding operation is required is because operation 1j-40 and operation 1j-45 may be consecutively performed instead of being performed once. For example, the gNB 1i-02 may deliver an NR UE capability request including RAT type and filtering information to the UE 1j-40, and receive a corresponding UE capability from the UE 1j-01 in operation 1i-45, and then repeat operation 1j-40 once again to request an EN-DC UE capability and receive a UE capability report corresponding to operation 1j-45. In this case, the CN 1j-03 may have to separately assign PLMN-based UE capability IDs for two consecutively received UE capabilities, such that index information for distinguishing the UE capabilities (for example, the first UE capability report may be set to 1 and the second UE capability report may be set to 2) may be included and delivered or filtering information may be delivered together.

In operation 1j-60, a method, performed by the CN 1i-03, of assigning a PLMN-based UE capability ID may apply different operations according to network implementation. For example, in an embodiment, a UE capability report may be received for a certain UE, and when the number of UE reports providing the same UE capability as the corresponding UE capability is greater than a predetermined threshold value N, the corresponding UE capability may be specified and the PLMN-based UE capability ID may be assigned. That is, an algorithm may be required in which a certain PLMN-based UE capability ID is not assigned merely with several UE capability reports.

In operation 1j-70, the UE 1j-01 may map the PLMN-based UE capability ID received from the CN 1j-03 in operation 1i-65 to a UE capability storage group reported and stored by the UE 1j-01 in operation 1j-50 and newly store them. That is, the UE 1j-01 may store a PLMN-based UE capability ID, registration PLMN information, RAT type and filtering information, and a reported UE capability in one group and then use a PLMN-based UE capability ID assigned to represent the UE capability. In the foregoing operation, the number of PLMN-based UE capability IDs that may be stored in the UE 1j-01 may be limited, and when the UE 1j-01 needs to store a UE capability for a new PLMN-based UE capability ID while storing a set number of PLMN-based UE capability IDs, the previously stored PLMN-based UE capability IDs and the corresponding UE capability group may be deleted and update with a new value may be performed. In the foregoing operation, information for the same PLMN may be left and information for a different PLMN may be deleted.

In operation 1j-75, the CN 1j-03 may deliver the PLMN-based UE capability ID delivered to the UE 1j-01 to the gNB 1j-02 through an N1 message.

In operation 1j-80, the gNB 1j-02 may store the PLMN-based UE capability ID, the registration PLMN information, the RAT type and the filtering information, and the reported UE capability as one group, based on the received PLMN-based UE capability ID, the UE capability received in operation 1j-45, and the RAT type and the filtering information delivered to the UE 1j-01 in operation 1i-40. Thereafter, when the UE 1j-01 uses the PLMN-based UE capability ID assigned to represent the UE capability, the gNB 1j-02 having received the PLMN-based UE capability ID may not trigger the UE capability request.

In the above-described embodiments, when a UE capability ID is delivered through an initial NAS message, the UE has several UE capability IDs (a manufacturer-based UE capability ID and a PLMN-based UE capability ID), the UE may deliver all of the UE capability IDs. Alternatively, the UE may report only a representative manufacturer-based UE capability ID.

Figure 1K:
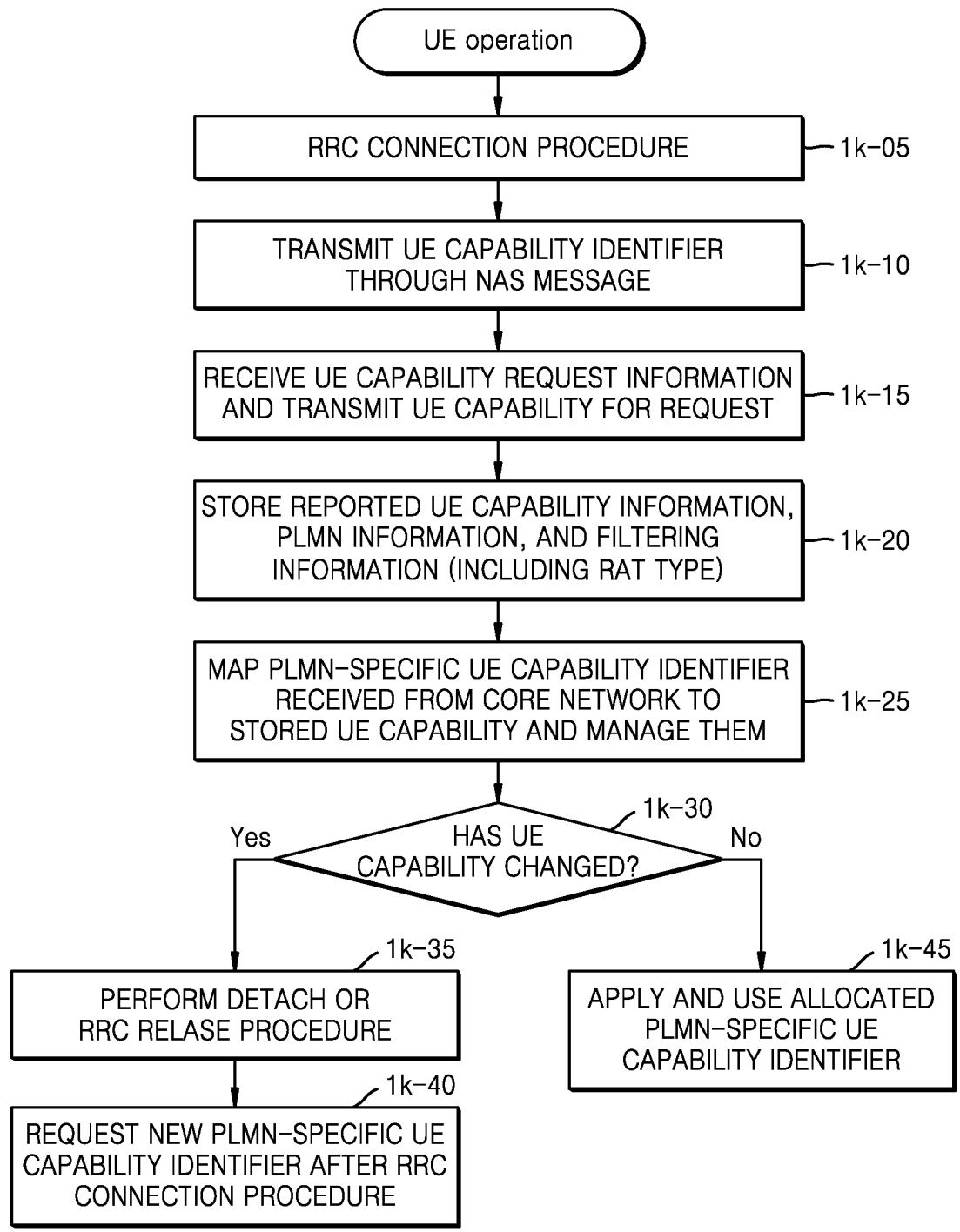
FIG. 1K is a view for describing an operation of being assigning with and updating a PLMN-based UE capability identifier, according to an embodiment.

FIG. 1K is a view for describing an operation of being assigning with and updating a PLMN-based UE capability identifier, according to an embodiment. More specifically, FIG. 1K is a view for describing an overall operation of being assigning with and updating a PLMN-based UE capability identifier, according to an embodiment.

In operation 1k-05, a UE may camp on a certain serving cell and switch to an RRC-connected state.

In operation 1k-10, immediately after connection to a corresponding cell, the UE may transmit a UE capability ID that the UE has to a core network associated with a base station through an NAS message (e.g., an INITIAL ATTACH message). The ID may include a manufacturer-based UE capability ID and a PLMN-based UE capability ID, and when the PLMN-based UE capability ID has not been assigned, the ID may include the manufacturer-based UE capability ID.

In operation 1k-15, when the core network or the base station fails recovery of the UE capability for the UE capability ID transmitted from the UE, the UE may receive a message requesting UE capability report and perform the UE capability report as a response, through the base station.

In operation 1k-20, the UE may store the UE capability reported in the previous operation, registered PLMN information, and filtering information (including RAT type).

In operation 1k-25, when the UE receives the PLMN-based UE capability ID from the core network, the UE may map the stored UE capability with the received PLMN-based UE capability ID and manage them in the foregoing operation. That is, in the subsequent operation, representation of the UE capability may be replaced with the assigned PLMN-based UE capability ID.

In operation 1k-30, the UE may determine whether the UE capability for the assigned PLMN-based UE capability ID has changed.

When the UE capability has changed, the UE may execute a DETACH or RRC Release procedure with a corresponding serving cell and a core network in operation 1k-35.

In operation 1k-40, the UE may request a new PLMN-based UE capability ID (notify that a previous PLMN-based UE capability ID has to be updated) after the UE performs again an RRC connection procedure with a certain cell. The foregoing requesting may be performed in an operation of delivering an NAS message to the core network after the RRC-connected state, and a procedure of being assigned with a new PLMN-based UE capability ID may include 1k-15 through 1k-25.

When the UE capability has changed in operation 1k-30, the UE may apply the PLMN-based UE capability ID assigned in operation 1k-25 to use it instead of the UE capability. That is, the UE may deliver the PLMN-based UE capability ID in RRC IDLE or a new UE capability report request.

Figure 1L:
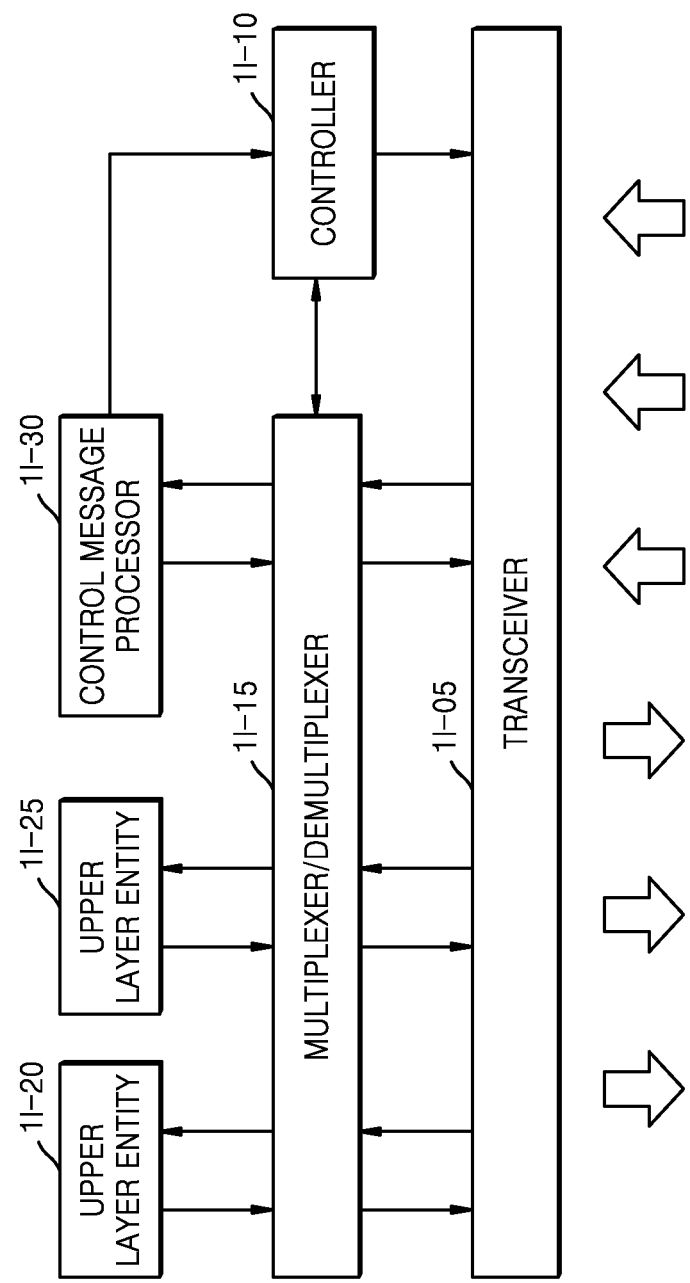
FIG. 1L is a block diagram of a structure of a UE, according to an embodiment.

FIG. 1L is a block diagram of a structure of a UE, according to an embodiment.

Referring to FIG. 1L, a UE according to an embodiment may include a transceiver 1l-05, a controller 1l-10, a multiplexer/demultiplexer 1l-15, various upper layer processors 1l-20 and 1l-25, and a control message processor 1l-30.

The transceiver 1l-05 receives data and a certain control signal through a forward channel carriers of a serving cell and transmits data and a predetermined control signal through a backward channel of the serving cell. When a plurality of serving cells are set, the transceiver 1l-05 performs data transmission and reception and control signal transmission and reception using the plurality of serving cells. The multiplexer/demultiplexer 1l-15 multiplexes data generated in the upper layer processors 1l-20 and 1l-25 or in the control message processor 1l-30 or demultiplexes data received from the transceiver 1l-05, so as to deliver the multiplexed or demultiplexed data to the upper layer processors 1l-20 and 1l-25 or the control message processor 1l-30.

The control message processor 1l-30 may transmit and receive a control message from the base station and perform a necessary operation. Herein, the necessary operation may include a function of processing a control message such as an RRC message and MAC CE, reporting a CBR measurement value, and receiving an RRC message for a resource pool and a UE operation. The upper layer processors 1l-20 and 1l-25 may mean DRB devices and may be configured for each service. Each of the upper layer processors 1l-20 and 1l-25 may process data generated in a user service such as a File Transfer Protocol (FTP) or a Voice over Internet Protocol (VoIP) to deliver the data to the multiplexer/demultiplexer 1l-15 or process data delivered from the multiplexer/demultiplexer 1l-15 to deliver the processed data to an upper-layer service application.

The controller 1l-10 identifies a scheduling instruction received through the transceiver 1l-05, e.g., UL grants, and controls the transceiver 1l-05 and the multiplexer/demultiplexer 1l-15 to perform UL transmission at a proper point in time with a proper transmission resource. Meanwhile, the UE includes a plurality of blocks, each of which performs a different function in the above-described embodiment, but this is merely an embodiment, without being limited thereto. For example, the controller 1l-10 may perform a function executed by the demultiplexer 1l-15.

Figure 1M:
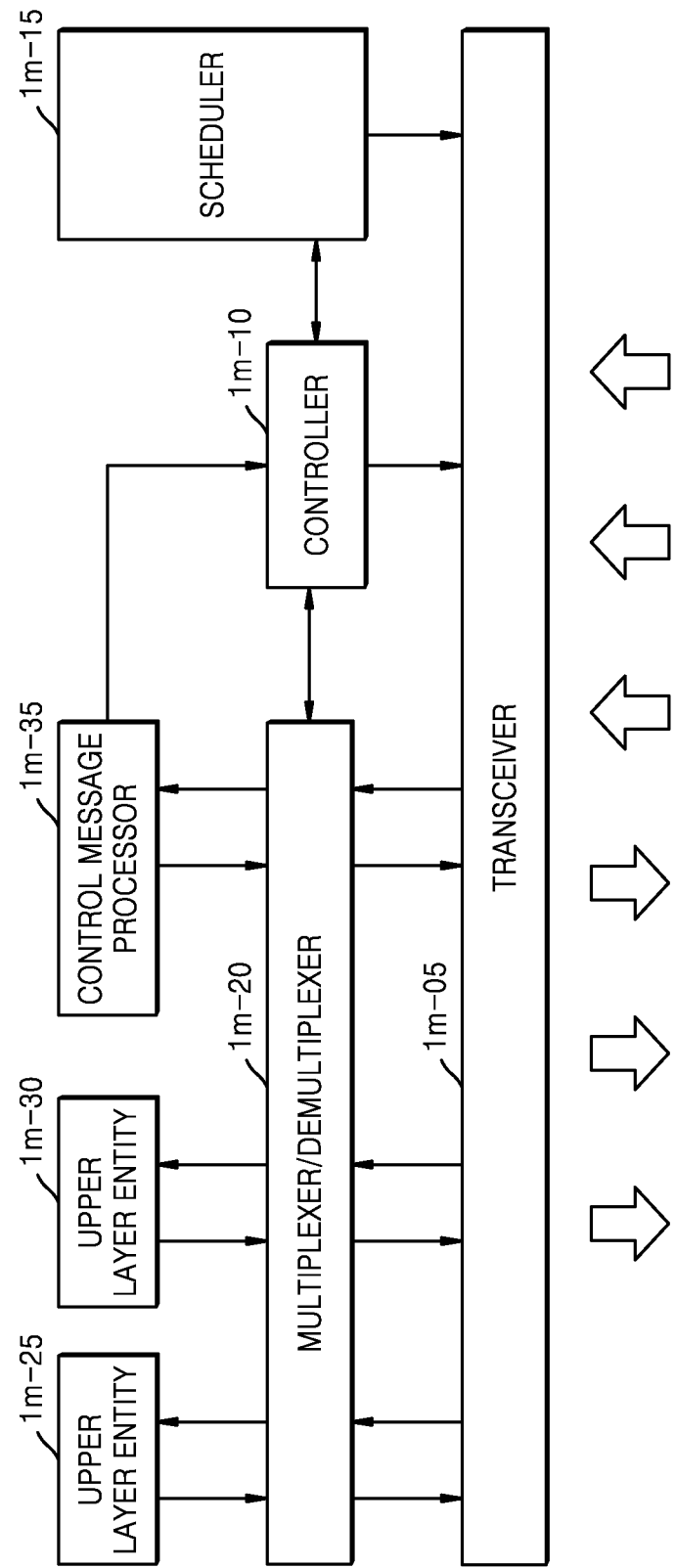
FIG. 1M is a block diagram of a structure of a base station, according to an embodiment.

FIG. 1M is a block diagram of a structure of a base station, according to an embodiment.

Referring to FIG. 1M, the base station may include a transceiver 1m-05, a controller 1m-10, a multiplexer/demultiplexer 1m-20, a control message processor 1m-35, various upper layer processors 1m-25 and 1m-30, and a scheduler 1m-15.

The transceiver 1m-05 may transmit data and a certain control signal through DL carriers and receive data and a certain control signal through UL carriers. When a plurality of carriers are configured, the transceiver 1m-05 may perform data transmission and reception and control signal transmission and reception using the above-described plurality of carriers. The multiplexer/demultiplexer 1m-20 may multiplex data generated in the upper layer processors 1m-25 and 1m-30 or in the control message processor 1m-35 or demultiplex data received from the transceiver 1m-05, so as to deliver the multiplexed or demultiplexed data to the upper layer processors 1m-25 and 1m-30, the control message processor 1m-35, or the controller 1m-10. The control message processor 1m-35 may generate a message to be delivered to the UE and deliver the generated message to a lower layer under control of the controller. Each of the upper layer processors 1m-25 and 1m-30 may be configured for each UE and each service, and process data generated in a user service such as an FTP or a VoIP to deliver the data to the multiplexer/demultiplexer 1m-20 or process data delivered from the multiplexer/demultiplexer 1m-20 to deliver the processed data to an upper-layer service application. The scheduler 1m-15 may allocate a transmission resource to the UE at a proper point in time, taking a buffer state of the UE, a channel state, and an active time of the UE into account, and control the transceiver to process a signal transmitted from the UE or to transmit a signal to the UE.

According to an embodiment, to reduce signaling overhead of a UE capability report in a procedure in which a UE receives a request for a UE capability from a base station and reports the UE capability to the base station in an NR system, a UE capability report may be replaced using identifier information specified for a UE having the same UE capability. In particular, a method according to the above-described embodiment may include a manufacturer-based UE identifier access method and a PLMN-based UE identifier access method. The foregoing embodiments may provide overall operations for a method of delivering a UE capability using a PLMN-based UE identifier.

According to an embodiment of the present disclosure, when an NR UE is indicated, by a base station, to report a UE capability for MR-DC, a UE capability report procedure performed by a UE may be clearly defined. Thus, the UE may accurately deliver its capability and the base station may accurately understand the capability of the UE and provide proper configuration information.

An embodiment of the present disclosure may propose a method of solving a problem in which RRC connection complete messaging for a target cell and a random access operation for a secondary cell group may overlap, when a UE changes the secondary cell group while performing a handover to the target cell in dual connection with a serving cell in an NR system.

According to an embodiment, when a UE changes a secondary cell group while performing a handover to a target cell in dual connection with a serving cell, RRC connection complete messaging for the target cell and a random access operation for a secondary cell group may not overlap and may be sequentially performed.

Figure 2A:
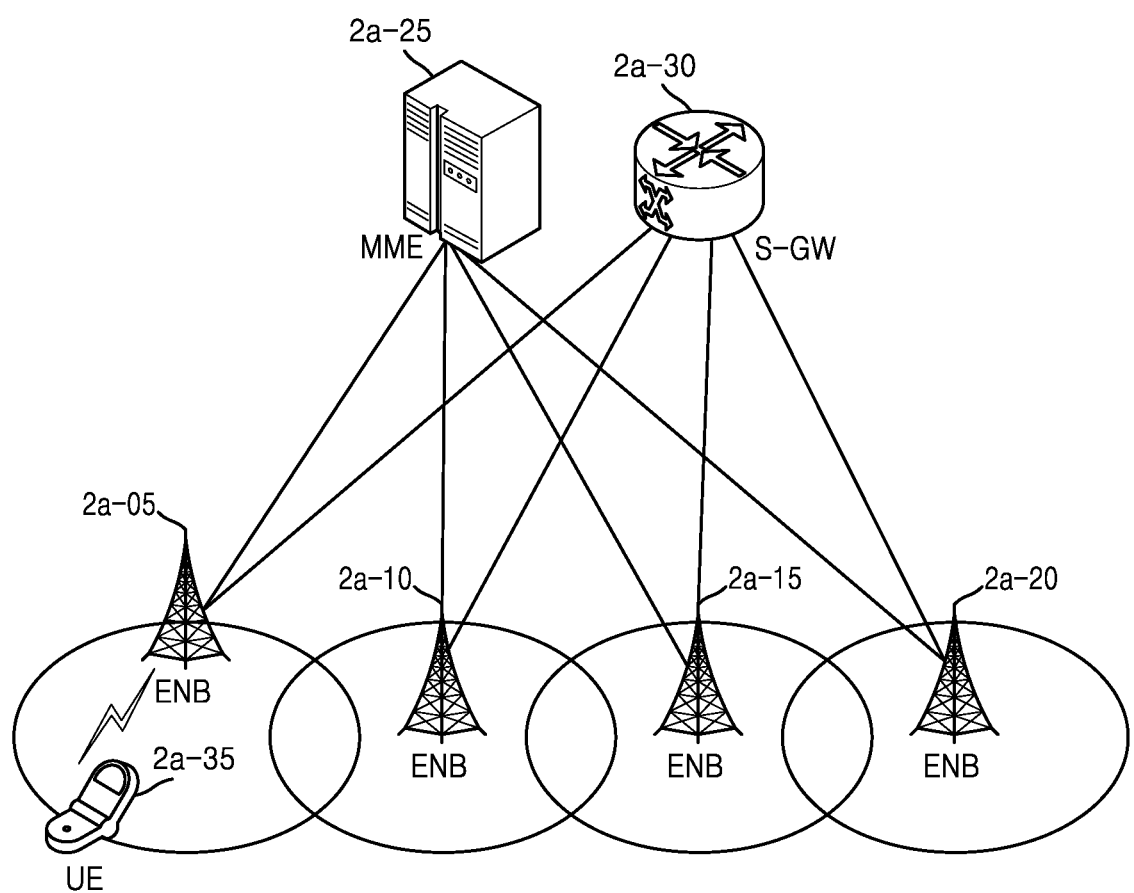
FIG. 2A illustrates a structure of an LTE system according to an embodiment.

FIG. 2A illustrates a structure of an LTE system according to an embodiment.

Referring to FIG. 2A, a radio access network of the LTE system may include a next-generation base station (eNB, Node B, or base station) 2a-05, 2a-10, 2a-15, and 2a-20, a mobility management entity (MME) 2a-25, and a serving gateway (S-GW) 2a-30. A user equipment (UE or terminal)

2a-35 may connect to an external network through the eNBs 2a-05 through 2a-20 and the S-GW 2a-30.

In FIG. 2A, the eNBs 2a-05 through 2a-20 may correspond to an existing Node B in a UMTS system. The eNB may be connected with the UE 2a-35 through a radio channel and play more complicated roles than the existing Node B. In the LTE system, every user traffic as well as a real-time service such as VoIP is provided through a shared channel, requiring a device for collecting state information of UEs, such as a buffer state, an available transmit power state, a channel state, etc., and performing scheduling based on the state information. Examples of such a device may be the eNBs 2a-05 through 2a-20. One eNB may generally control a plurality of cells. For instance, to implement a transmission speed of 100 Mbps, the LTE system may use, for example, OFDM as a wireless connection scheme in a bandwidth of 20 MHz. Also, AMC may be used in which a modulation scheme and a channel coding rate are determined based on a channel state of a UE. The S-GW 2a-30 may be a device for providing a data bearer, and generate or remove the data bearer under control of the MME 2a-25. The MME is in charge of various control functions as well as a mobility management function for the UE, and may be connected with the plurality of BSs.

Figure 2B:
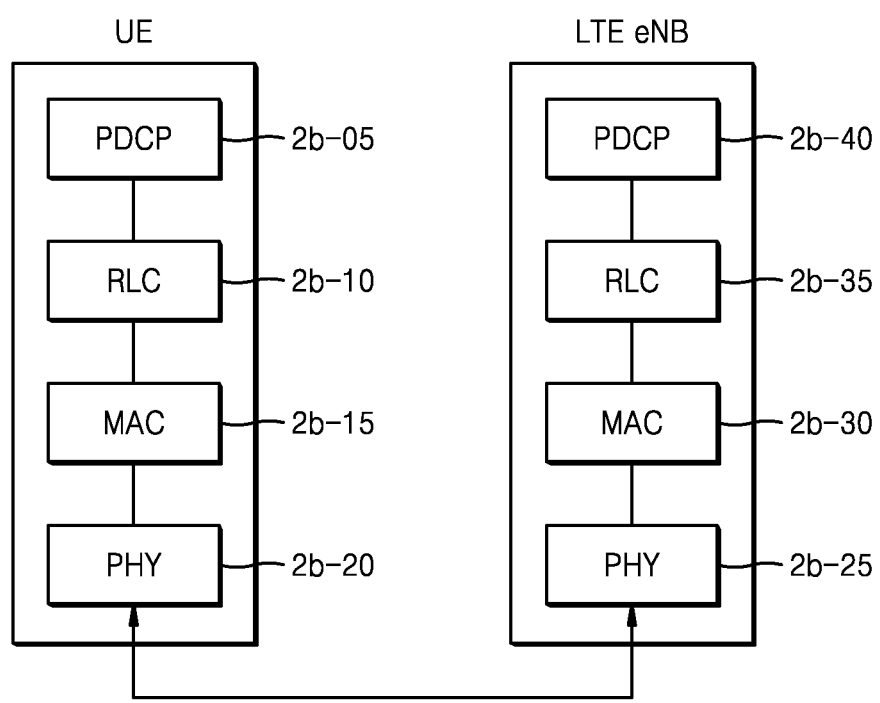
FIG. 2B illustrates a radio protocol architecture in an LTE system according to an embodiment.

FIG. 2B illustrates a radio protocol architecture in an LTE system according to an embodiment.

Referring to FIG. 2B, a radio protocol of the LTE system may include PDCPs 2b-05 and 2b-40, RLCs 2b-10 and 2b-35, and MACs 2b-15 and 2b-30, respectively, at a UE and an eNB. The PDCPs 2b-05 and 2b-40 may be responsible for IP header compression/decompression or the like. Main functions of the PDCPs may be summarized as follows:

Header compression and decompression (ROHC only)
Transfer of user data
In-sequence delivery of upper-layer PDUs at PDCP re-establishment procedure for RLC AM
For split bearers in DC (only support for RLC AM): PDCP PDU routing for transmission and PDCP PDU reordering for reception
Duplicate detection of lower-layer SDUs at PDCP re-establishment procedure for RLCAM
Retransmission of PDCP SDUs at handover and, for split bearers in DC, of PDCP PDUs at PDCP data-recovery procedure, for RLC AM
Ciphering and deciphering
Timer-based SDU discard in uplink)

The RLCs 2b-10 and 2b-35 may reconstruct a PDCP PDU into a proper size and perform an ARQ operation. Main functions of the RLCs may be summarized as follows:

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layers 2b-15 and 2b-30 may be connected to a plurality of RLC-layer entities configured in one UE, multiplex RLC PDUs into a MAC PDU, and demultiplex an MAC PDU into RLC PDUs. Main functions of the MACs may be summarized as follows:

Mapping between logical channels and transport channels
Multiplexing/demultiplexing of MAC SDUs belonging to one or different logical channels into/from TB delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical (PHY) layers 2b-20 and 2b-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

For further error correction in a physical layer, HARQ is used, in which a reception end transmits 1 bit as information about whether a packet transmitted from a transmission end has been received. This information may be referred to as HARQ ACK/NACK information. DL HAQR ACK/NACK information for UL transmission is transmitted through a PHICH physical channel, and UL HARQ ACK/NACK information for DL transmission is transmitted through a PUCCH or PUSCH physical channel.

Meanwhile, the foregoing PHY layer may include one frequency/carrier or a plurality of frequencies/carriers, and a technique for simultaneously setting the plurality of frequencies to use them may be referred to as CA. CA may additionally use a primary carrier and one secondary carrier or a plurality of secondary carriers instead of using one carrier for communication between a terminal (or UE) and a base station (E-UTRAN NodeB or eNB). By using CA, the amount of transmission may be innovatively increased as much as the number of secondary carriers. Meanwhile, in LTE, a cell using a primary carrier in a base station may be referred to as a PCell and a cell using a secondary carrier may be referred to as an SCell.

Although not shown, an RRC layer may exist on PDCP layers of the UE and the eNB, respectively. The above-described RRC layer may exchange configuration control messages related to connection and measurement for RRC.

Figure 2C:
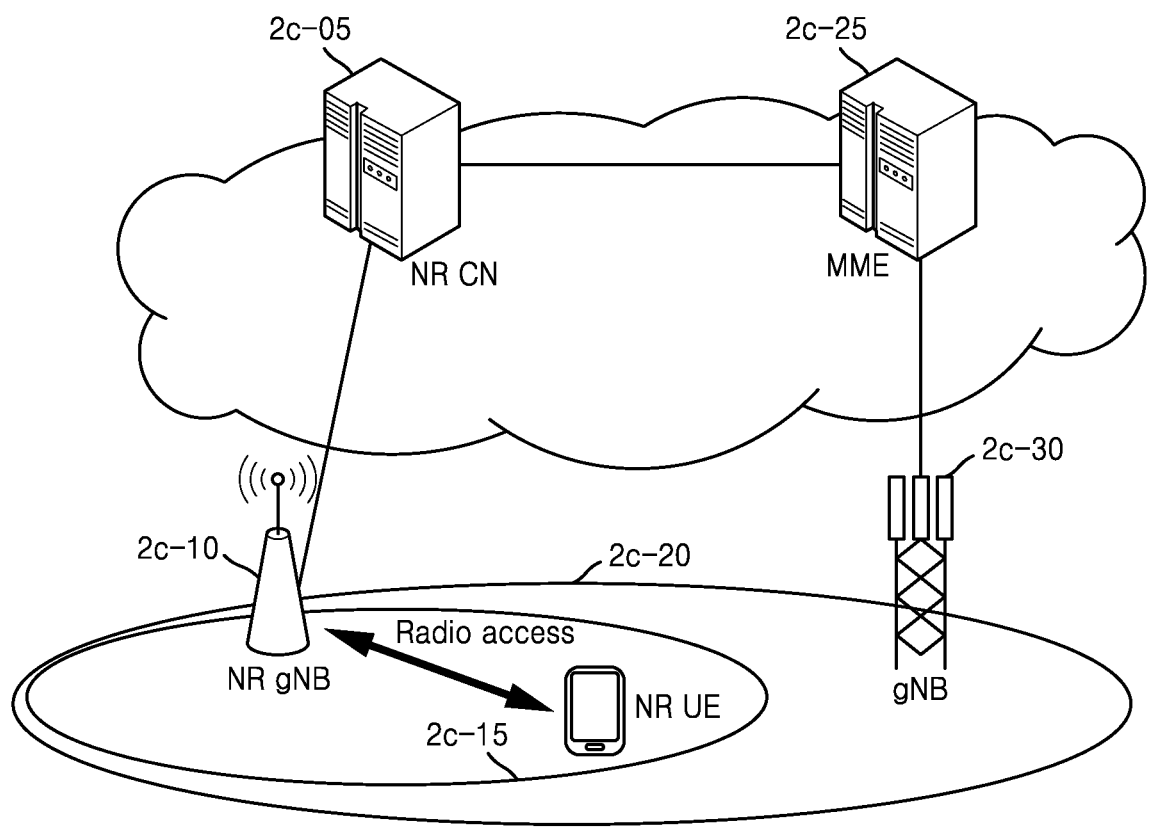
FIG. 2C illustrates a structure of a next-generation mobile communication system according to an embodiment.

FIG. 2C illustrates a structure of a next-generation mobile communication system according to an embodiment.

Referring to FIG. 1C, as illustrated, a radio access network of the next-generation mobile communication (hereinafter, NR or 5G) system may include an NR NB 2c-10 and an NR core network (CN) or a next-generation (NG) CN 2c-05. A new radio user equipment (NR UE or UE) 2c-15 may access an external network through the NR NB 2c-10 and the NR CN 2c-05.

In FIG. 2C, the NR NB 2c-10 may correspond to an eNB of an existing LTE system. The NR NB 2c-10 may be connected to the NR UE 2c-15 over a radio channel and may provide a more advanced service than that of the existing Node B. In the next-generation mobile communication system, all user traffic is served through a shared channel, requiring a device that collects state information, such as UEs' buffer status, available transmission power state, and channel state, and performs scheduling, in which the NR NB 2c-10 may be responsible for these functions. One NR NB 2c-10 may generally control a plurality of cells. In order to realize ultra-high-speed data transmission compared to an LTE system, the next-generation mobile communication system may have a maximum bandwidth greater than the existing maximum bandwidth and may employ a beamforming technique in addition to OFDM as a radio access technology. Also, AMC may be used in which a modulation scheme and a channel coding rate are determined based on a channel state of a UE. The NR CN 2c-05 may perform functions such as mobility support, bearer setup, QoS setup, etc. The NR CN 2c-05 may be a device that performs not only a mobility management function for a UE but also various control functions and may be connected to a plurality of base stations. The next-generation mobile communication system may also interwork with the existing LTE system, in which the NR CN 2c-05 may be connected to an MME 2c-25 through a network interface. The MME 2c-25 may be connected to the eNB 2c-30, which is an existing base station.

Figure 2D:
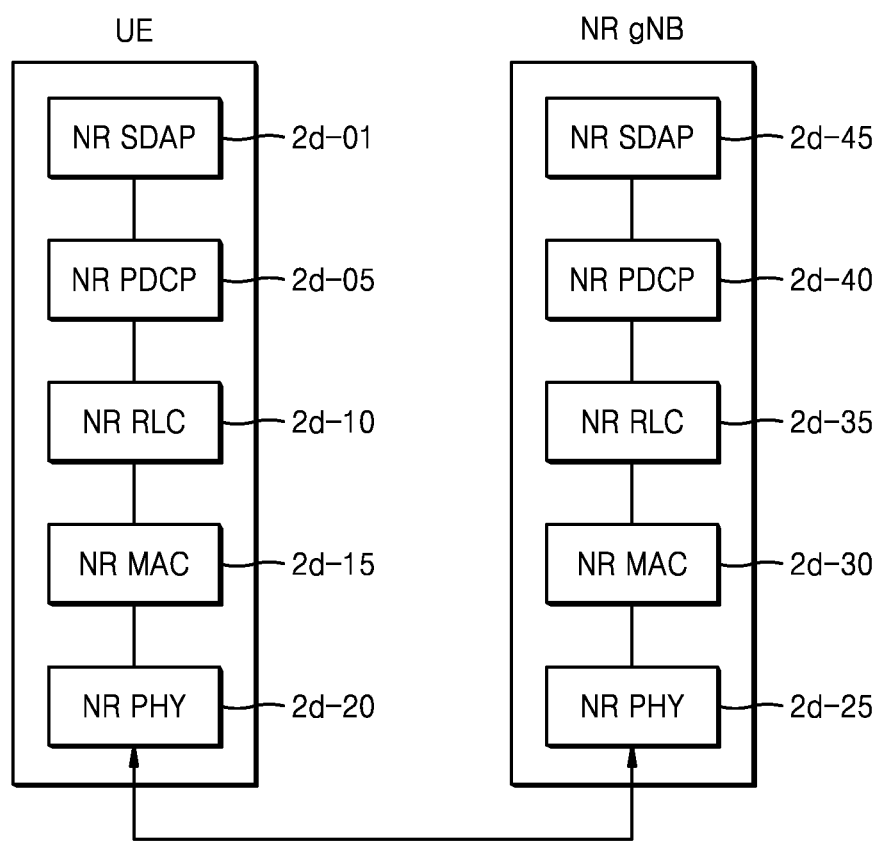
FIG. 2D illustrates a radio protocol architecture of a next-generation mobile communication system according to an embodiment.

FIG. 2D illustrates a radio protocol architecture of a next-generation mobile communication system according to an embodiment.

Referring to FIG. 2D, a radio protocol of the next-generation mobile communication system may include NR SDAPs 2d-01 and 2d-45, NR PDCPs 2d-05 and 2d-40, NR RLCs 2d-10 and 2d-35, and NR MACs 2d-15 and 2d-30, respectively at a UE and an NR gNB.

Main functions of the NR SDAPs 2d-01 and 2d-45 may include some of the following functions:
Transfer of user plane data
Mapping between a QoS flow and a DRB for both DL and UL
Marking QoS flow ID in both DL and UL packets
Reflective QoS flow to DRB mapping for the UL SDAP PDUs For the foregoing SDAP layer entity, a UE may be set whether to use a header of an SDAP layer entity or a function of the SDAP layer entity for each PDCP layer entity, each bearer, or each logical channel, through an RRC message, and when an SDAP header is set, it may be indicated using a network attached storage (NAS) QoS reflective configuration 1-bit indicator (NAS reflective QoS) and an AS QoS reflective configuration 1-bit indicator (AS reflective QoS) that the UE may update or reconfigure a QoS flow of an UL and a DL and mapping information regarding a data bearer. The SDAP header may include QoS flow ID information indicating a QoS. The QoS information may be used as data processing priority information, scheduling information, etc., for supporting a smooth service.

Main functions of the NR PDCPs 2d-05 and 2d-40 may include some of the following functions:
Header compression and decompression: (ROHC only)
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink)

Herein, reordering of an NR PDCP entity may refer to a function of reordering PDCP PDUs received from a lower layer in order based on a PDCP SN and delivering data to an upper layer in the reordered order. The reordering function of the NR PDCP device may include at least one of delivering data to an upper layer in a reordered order, immediately delivering the data without considering an order, recording lost PDCP PDUs due to reordering, reporting a state of the lost PDCP PDUs to a transmission side, or requesting retransmission of the lost PDCP PDUs.

Main functions of the NR RLCs 2d-10 and 2d-35 may include some of the following functions:
Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment Herein, the in-sequence delivery function of the NR RLC entities may refer to a function of delivering RLC SDUs received from a lower layer to an upper layer in order. The in-sequence delivery of the NR RLC entities may include a function of reassembling and delivering several RLC SDUs when one RLC SDU is segmented into the several RLC SDUs and then the several RLC SDUs are received.

The in-sequence delivery of the NR RLC entities may include at least one of reordering the received RLC PDUs based on an RLC sequence number (SN) or a PDCP SN, reordering recording lost PDCP PDUs due to reordering, reporting a state of the lost PDCP PDUs to a transmission side, or requesting retransmission of the lost PDCP PDUs. When there is any lost RLC SDU, the in-sequence delivery function of the NR RLC entities may include a function of delivering RLC SDUs previous to the lost RLC SDU to an upper layer in order.

The in-sequence deliver function may also include a function of delivering all the RLC SDUs received before start of the timer to an upper layer in order when a certain timer has expired in spite of existence of an RLC SDU, or a function of delivering all the RLC SDUs received up to the present time when the certain timer has expired in spite of existence of an RLC SDU. The NR RLC entities may process RLC PDUs in order of reception (the order of arrival regardless of the order of SNs) and deliver the RLC PDUs to the PDCP entities in an out-of-sequence manner, and for a segment, the NR RLC entities may receive segments that are stored in a buffer or are to be received later, may reconstruct the segment into one whole RLC PDU, may process the RLC PDU, and may deliver the RLC PDU to the PDCP entities. The NR RLC layers may not include a concatenation function, and the concatenation function may be performed in the NR MAC layers or may be replaced with a multiplexing function of the NR MAC layers.

Herein, the out-of-sequence delivery of the NR RLC entities may include a function of immediately delivering RLC SDUs received from a lower layer to an upper layer regardless of an order. The out-of-sequence delivery of the RLC entities may include at least one of a function of re-assembling and delivering a plurality of RLC SDUs when one original RLC SDU is divided into the plurality of RLC SDUs to be received, or a function of recording lost RLC PDUs by storing and reordering the RLC SNs or PDCP SNs of received RLC PDUs.

The NR MACs 2d-15 and 2d-30 may be connected to a plurality of NR RLC-layer entities configured in one UE, and main functions of the NR MACs may include some of the following functions:
Mapping between logical channels and transport channels
Multiplexing/demultiplexing of MAC SDUs Scheduling information reporting
Error correction through HARQ
Priority handling between logical channels of one UE
Priority handling between UEs by means of dynamic scheduling
MBMS service identification
Transport format selection
Padding NR PHY layers 2d-20 and 2d-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

FIG. 2E is a flowchart for describing a case where secondary cell group changing and handover requesting are performed through one RRC message, according to an embodiment.

In an embodiment of the present disclosure, it may be assumed that when a handover occurs especially in an MR-DC context, change of a secondary node (SN) is concurrently instructed and thus occurs. In an embodiment, an overall UE operation may be described in which a handover may be performed without any problem in this context. That is, in a method according to an embodiment, when a handover and an SN change are concurrently instructed, a random access to a master node (MN) to be changed and a random access to an SN to be changed may be sequentially performed to reduce interruption between two nodes. FIG. 2E is an overall flowchart in the foregoing context, and may be directly applied to an embodiment. Moreover, in FIG. 2E, for example, even in an MR-DC context, connection to, especially, a 5G core network, and an NR cell as an MN may be assumed. In this case, an SN may be an NR cell or an LTE cell. That is, in an embodiment described with reference to FIG. 2E, NR-E-UTRA (NE)-DC and NR-DC may be applied.

A UE 2E-01 may be connected with a serving cell of a source MN 2e-02 and perform communication through DC setup with a source SN 2e-03, and a handover may be triggered for a certain reason. The certain reason may include a case where a channel measurement value is higher than a certain threshold value in a neighboring cell when compared to a current serving cell.

In operation 2e-10, the serving cell of the source MN 2e-02 having determined a handover may deliver a handover request message requesting a handover to a cell of a target MN 2e-05 to which the handover is to be made. When the handover is requested, an SN change procedure (SCG change) may be performed. This may include that change from the source SN 2e-03 to another target SN 2e-04 needs to be processed concurrently with the handover.

In operation 2e-15, the target MN 2e-05 having received the handover request may deliver an SN addition request message to the target SN 2e-04.

In operation 2e-20, the target SN 2e-04 may deliver a corresponding response message.

In operation 2e-25, the target MN 2e-05 may deliver a handover request acknowledgement message to the source MN 2e-02 in response to the handover.

In operation 2e-30, the source MN 2e-02 having received the handover request acknowledgement message may deliver an SN release message to the source SN 2e-03 in which DC is set.

In operation 2e-35, the source SN 2e-02 may deliver an SN release request acknowledgement message with respect to the SN release request.

In operation 2e-40, the source MN 2e-02 having acknowledged that the handover may be performed through the foregoing procedure may deliver an RRCReconfiguration message to the UE 2e-01 to indicate the handover request. The RRCReconfiguration message may include configurations for a master cell group and a secondary cell group that are newly configured through the handover, and the configurations may include a reconfigurationWithSync field including a parameter required for synchronization due to the handover and a parameter required for a handover operation.

Information configured in the above-described reconfigurationWithSync field may include serving cell configuration information for a PCell and a PSCell, a radio network temporary identifier (RNTI), a T304 timer, and so forth, and RACH resource information regarding random access channel (RACH) resources capable of performing a random access.

The UE 2e-01 having received an RRCReconfiguration message concurrently indicating a handover and an SN change in operation 2e-40 may perform a random access to the target MN 2e-05 in operation 2e-45.

In operation 2e-50, the UE 2e-01 may deliver an RRCReconfigurationComplete message to the target MN 2e-05 and indicate completion of the handover.

After completion of the foregoing operation, in operation 2e-55, the UE may perform the random access procedure for the target SN 2e-04. However, when operations 2e-45 through 2e-55 reflect the current standards, the handover and the SN change may occur at the same time, such that a random access to the target MN 2e-05 and a random access to the target SN 2e-04 may be interrupted. Alternatively, transmission of the RRCReconfigurationComplete message to the target MN 2e-05 and the random access to the target SN 2e-04 may be interrupted.

In this case, an intended random access operation has not been correctly performed, such that the handover procedure may not be perfectly performed. That is, in an embodiment of the present disclosure, when a handover and an SN change are concurrently instructed, a random access to an MN to be changed and a random access to an SN to be changed may be sequentially performed to reduce interruption between two nodes. An existing UE operation and a detailed UE operation according to an embodiment will be described in more detail with reference to FIGS. 2F and 2G.

In operation 2e-60, the target MN 2e-05 may deliver an SN Reconfiguration Complete message indicating completion of reconfiguration, based on a response indicating completion of a handover and an SN change to the target SN 2e-04 through the RRCReconfigurationComplete message received from the UE 2e-01 in operation 2e-50.

In operation 2e-65, the source SN 2e-03 may deliver the amount of data, delivered from the source SN, in a secondary RAT to the source MN 2e-02.

In operation 2e-70, the source MN 2e-03 may deliver a secondary RAT report delivered from an SN to an access and mobility management function (AMF) 2e-07.

In operation 2e-75, the source MN 2e-03 may deliver a data packet received from a UE before a handover and sequence number information for the delivered data packet to the target MN 2e-05.

In operation 2e-80, the source MN 2e-03 may deliver a DL data packet received through a user plane function (UPF) 2e-06 to the target MN 2e-05.

In operation 2e-85, the target SN 2e-05 may deliver a message requesting change of a data path for a user plane to the AMF 2e-07.

In operation 2e-90, the AMF 2e-07 may deliver bearer information modification to the UPF 2e-06.

In operation 2e-95, the UPF 2e-06 may create and indicate a new MN terminated bearer path.

In operation 2e-100, the UPF 2e-06 may deliver a newly created SN terminated bearer path to the target SN 2e-04.

The AMF 2e-07 may notify the target MN 2e-05 of completion of a path change in operation 2e-105, the target MN 2e-05 may request release of a UE context from the source MN 2e-02 in operation 2e-110, and the source MN 2e-02 may acknowledge the request and request release of the UE context from the source SN 2e-03 in operation 2e-115.

Figure 2F:
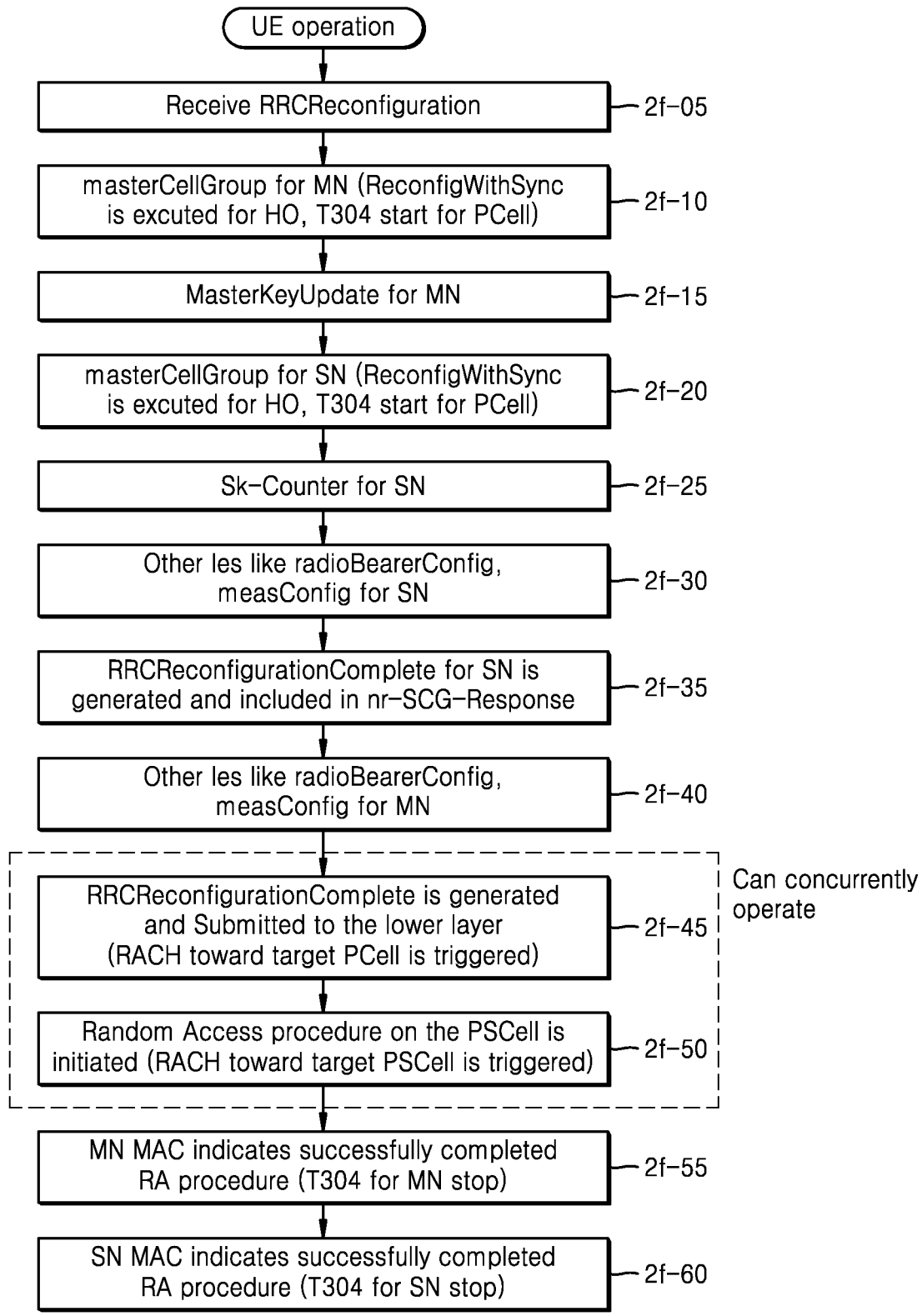
FIG. 2F is a flowchart for describing an existing UE operation in a case where secondary cell group changing and handover requesting are performed through one radio resource control (RRC) message, according to an embodiment.

FIG. 2F is a flowchart for describing an existing UE operation in a case where secondary cell group changing and handover requesting are performed through one RRC message, according to an embodiment.

In an embodiment described with reference to FIG. 2F, for a case where a handover occurs especially in an MR-DC context and change of an SN is concurrently instructed, the current standards may be described. In a method according to an embodiment, in the above-described handover context, a random access to a target MN and a random access to a target SN are performed at the same time. That is, in a method according to an embodiment, when a handover and an SN change are concurrently instructed, a random access to an MN to be changed and a random access to an SN to be changed are concurrently performed, causing interruption between two nodes.

In operation 2f-05, the UE may receive an RRCReconfiguration message indicating a handover from a source MN to a target MN. The RRCReconfiguration message may include configurations for a master cell group and a secondary cell group that are newly configured through the handover, and the configurations may include a reconfigurationWithSync field including a parameter required for synchronization due to the handover and a parameter required for a handover operation. Information configured in the above-described reconfigurationWithSync field may include serving cell configuration information for a PCell and a PSCell, an RNTI, a T304 timer, and so forth, and RACH resource information regarding RACH resources capable of performing a random access.

The subsequent procedure may regard to an internal operation of the UE when the above-described RRCReconfiguration message is received.

In operation 2f-10, the UE may identify masterCellGroup configuration information for an MN, included in the received RRCReconfiguration message, and apply the same. That is, in a corresponding operation, the UE may execute ReconfigurationwithSync configuration information, which is configuration information for a handover to a target MN, and this operation may include initiating the received T304 timer (dedicated for a PCell).

In operation 2f-15, when a MasterKeyUpdate field for an MN is included in the above-described RRCReconfiguration message, the UE may perform an operation of updating a key used for MN encryption, KgNB.

In operation 2f-20, when a mrdc-SecondarySellGroup configuration is included in the above-described RRCReconfiguration message, that is, configuration information for an SCG in a DC context (NR SCG or LTE SCG configuration is possible), masterCellGroup configuration information for an SN included in the same may be applied.

That is, the RRCReconfiguration message may include configuration information for an SN changed in a handover, and may start the T304 timer dedicated for PSCell for an SN while executing ReconfigurationwithSync configuration information.

In 2f-25, when sk-Counter information is included in configuration information for the foregoing SCG, the UE may perform a key update operation for the SN.

In operation 2f-30, the UE may perform additional configuration information such as radiobearerConfig and measConfig for the SN when a corresponding configuration exists.

In operation 2f-35, the UE may generate an SN-dedicated RRCReconfigurationComplete message as a response to SN-dedicated reconfiguration information in a configured MR-DC and include the same in an nr-SCG-Response (or eutra-SCG-Response) message.

In operation 2f-40, the UE may identify reconfiguration information for the remaining MN and execute the same. That is, in a corresponding operation, when a corresponding configuration exists, additional configuration information such as radiobearerConfig and measConfig for the MN may be executed.

In operation 2f-45, the UE may generate an RRCReconfigurationComplete message as a response to the received RRCReconfiguration message and deliver the same to a lower layer. The above-described RRCReconfigurationComplete message may include nr-SCG-Response (or eutra-SCG-Response) generated in operation 2f-35 in an octet form. In the above-described operation, the UE may be indicated, via RRC, to perform a random access to a target PCell and execute the random access to the target PCell.

In operation 2f-50, the UE may be indicated, via RRC, to perform a random access to a target PSCell and execute the random access to the target PSCell. However, operation 2f-45 and operation 2f-50 may be concurrently performed, and the random access to the target PCell and the random access to the target PSCell may be interrupted.

In an embodiment, when random access preamble transmission may concurrently occur in an MN and an SN, the MN may maintain transmission power with a priority, but in this case, the SN may be affected. That is, a loss may occur in power transmission and thus an UL coverage may not be secured, failing in the random access. When transmission of the RRCReconfiguratoinComplete message and transmission of the SN random access preamble occur concurrently, the SN random access preamble may have a priority, such that delivery of the RRCReconfigurationComplete that has to be delivered to the target MN may fail or be delayed. This is because PRACH transmission has a priority over PUSCH transmission.

Upon completion of the foregoing random access procedures for the target MN and the target SN, in operation 2f-55, the target MN MAC layer may indicate completion of the random access and stop the T304 timer for the PCell.

Likewise, in operation 2f-60, the target SN MAC layer may indicate completion of the random access and stop the T304 timer for the PSCell.

Figure 2G:
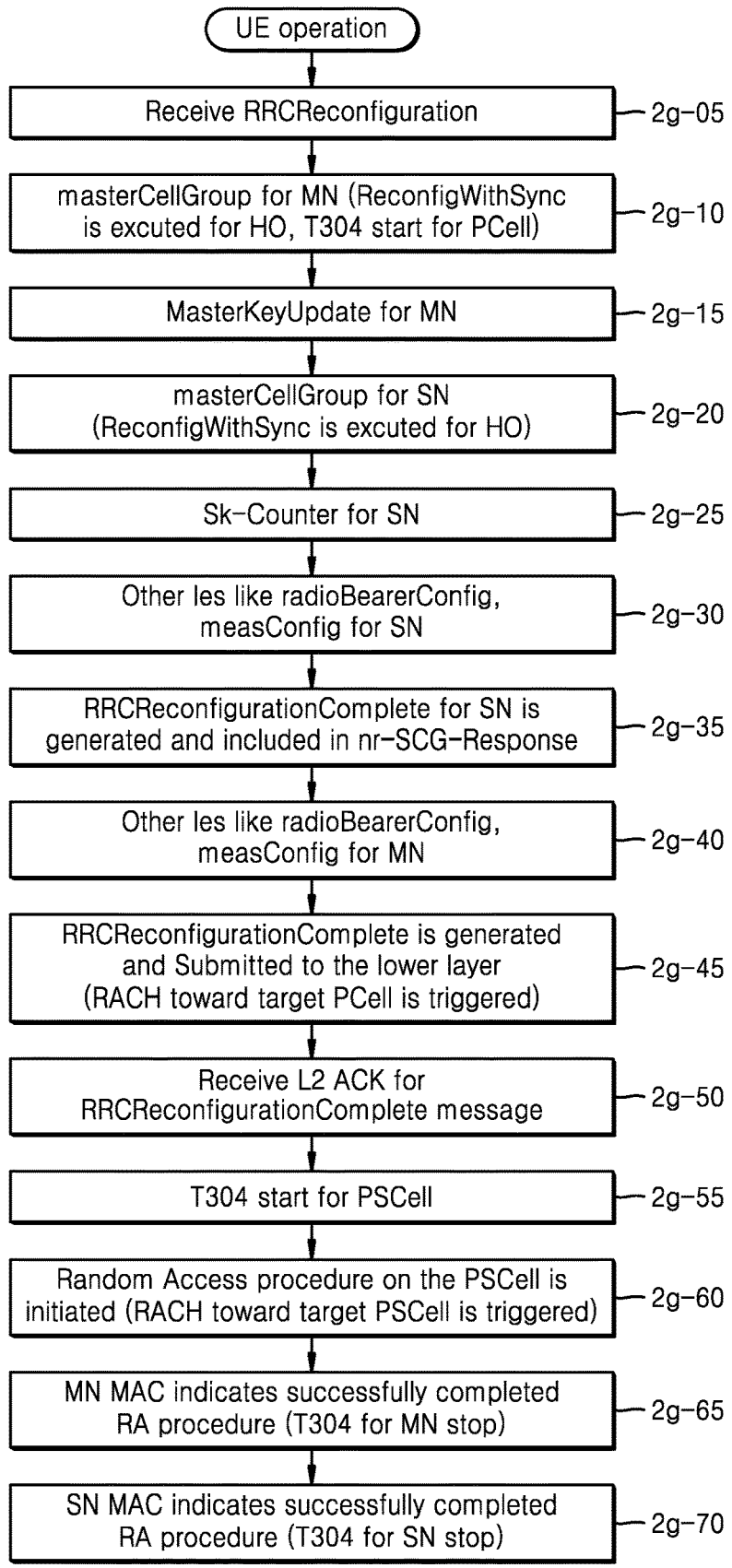
FIG. 2G is a flowchart for describing a method of sequentially performing random accesses to a master cell group and a secondary cell group in a case where secondary cell group changing and handover requesting are performed through one radio resource control (RRC) message, according to an embodiment.

FIG. 2G is a flowchart for describing a method of sequentially performing random accesses to a master cell group and a secondary cell group in a case where secondary cell group changing and handover requesting are performed through one RRC message, according to an embodiment.

In an embodiment of the present disclosure, for a case where a handover occurs especially in an MR-DC context and change of an SN is concurrently instructed, the current standards may be described. In a method according to an embodiment, in the above-described handover context, a random access to a target MN and a random access to a target SN are performed sequentially. When a handover and an SN change are concurrently instructed, a random access to an MN to be changed and a random access to an SN to be changed may be sequentially performed according to an embodiment, thus reducing interruption between two nodes.

In operation 2g-05, the UE may receive an RRCReconfiguration message indicating a handover from a source MN to a target MN. The RRCReconfiguration message may include configurations for a master cell group and a secondary cell group that are newly configured through the handover, and the configurations may include a reconfigurationWithSync field including a parameter required for synchronization due to the handover and a parameter required for a handover operation. Information configured in the above-described reconfigurationWithSync field may include serving cell configuration information for a PCell and a PSCell, an RNTI, a T304 timer, and so forth, and RACH resource information regarding RACH resources capable of performing a random access.

The subsequent procedure may regard to an internal operation of the UE when the above-described RRCReconfiguration message is received.

In operation 2g-10, the UE may identify masterCellGroup configuration information for an MN, included in the received RRCReconfiguration message, and apply the same. That is, in a corresponding operation, the UE may execute ReconfigurationwithSync configuration information, which is configuration information for a handover to a target MN, and this operation may include initiating the received T304 timer (dedicated for a PCell).

In operation 2g-15, when a MasterKeyUpdate field for an MN is included in the above-described RRCReconfiguration message, the UE may perform an operation of updating a key used for MN encryption, KgNB.

In operation 2g-20, when a mrdc-SecondarySellGroup configuration is included in the above-described RRCReconfiguration message, that is, configuration information for an SCG in a DC context (NR SCG or LTE SCG configuration is possible), masterCellGroup configuration information for an SN included in the same may be applied. That is, the above-described RRCReconfiguration message may include configuration for an SN to be changed in a handover, such that the UE may execute ReconfigurationwithSync configuration information. However, in the corresponding operation, even when the T304 timer dedicated for the PSCell for the SN is included, the UE may not execute the same. This is because as the sequential random access operations for the target MN and the target SN are performed, there is a time gap between start of the T304 timer for the PSCell and actual start of a random access in the target SN, defeating the purpose of a T304 operation for determining a UE operation by determining a time required for the handover procedure.

Although described in the following operations, in an embodiment of the present disclosure, the random access may start in the target SN after completion of the handover procedure (random access) in the target MN, such that the T304 timer for the PSCell may start when the random access in the target SN starts.

In 2g-25, when sk-Counter information is included in configuration information for the foregoing SCG, the UE may perform a key update operation for the SN.

In operation 2g-30, when a corresponding configuration exists, additional configuration information such as radiobearerConfig and measConfig for the SN may be executed.

In operation 2g-35, the UE may generate an SN-dedicated RRCReconfigurationComplete message as a response to SN-dedicated reconfiguration information in a configured MR-DC and include the same in an nr-SCG-Response (or eutra-SCG-Response) message.

In operation 2g-40, the UE may identify reconfiguration information for the remaining MN and execute the same. That is, in a corresponding operation, when a corresponding configuration exists, additional configuration information such as radiobearerConfig and measConfig for the MN may be executed.

In operation 2g-45, the UE may generate an RRCReconfigurationComplete message as a response to the received RRCReconfiguration message and deliver the same to a lower layer. The above-described RRCReconfigurationComplete message may include nr-SCG-Response (or eutra-SCG-Response) generated in operation 2g-35 in an octet form. In the foregoing operation, the UE may be indicated, via RRC, to perform a random access to a target PCell and execute the random access to the target PCell.

In operation 2g-50, the UE may determine whether the RRCReconfigurationComplete message delivered to the target MN has completely delivered and then perform the next operation. That is, in operation 2g-50, the UE may receive a Layer2 acknowledgement (ACK) message with respect to the RRCReconfigurationComplete message and then perform the corresponding operation, followed by a procedure described below.

After reception of the Layer2 ACK message with respect to the RRCReconfigurationComplete message, the UE may start the T304 timer for the PSCell in operation 2g-55.

In operation 2g-60, the UE may perform a random access to the target PSCell. Through the above-described sequential procedure, random access and handover operations for the target MN and the target SN may not be concurrently performed, preventing interruption in random access preamble transmission for the MN and the SN.

Upon completion of the foregoing random access procedures for the target MN and the target SN, in operation 2g-65, the target MN MAC layer may indicate completion of the random access and stop the T304 timer for the PCell.

Likewise, in operation 2f-70, the target SN MAC layer may indicate completion of the random access and stop the T304 timer for the PSCell.

Figure 2H:
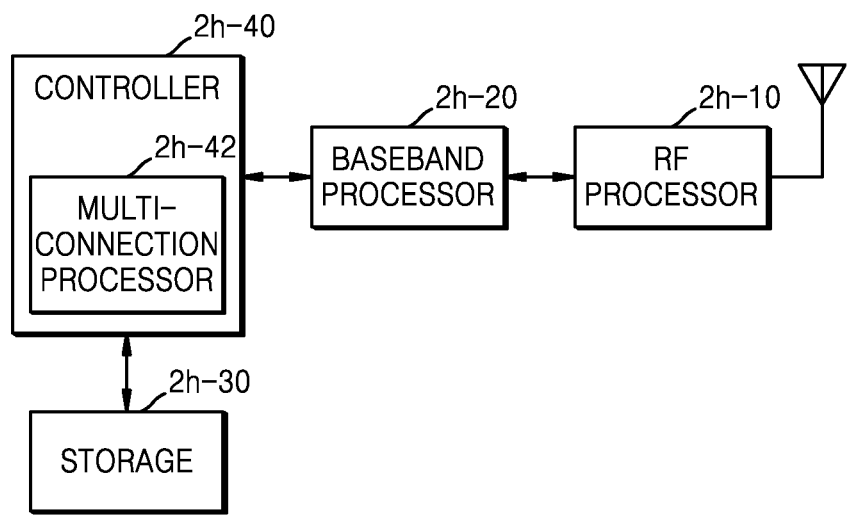
FIG. 2H is a block diagram of a structure of a UE, according to an embodiment.

FIG. 2H is a block diagram of a structure of a UE, according to an embodiment.

Referring to FIG. 2H, a UE may include an RF processor 2h-10, a baseband processor 2h-20, a storage 2h-30, and a controller 2h-40.

The RF processor 2h-10 may perform a function for transmitting and receiving a signal through a wireless channel, such as band translation, amplification, and so forth. That is, the RF processor 2h-10 may up-convert a baseband signal provided from the baseband processor 2h-20 into an RF band signal, transmit the RF band signal through an antenna, and down-convert an RF band signal received through the antenna into a baseband signal. For example, the RF processor 2h-10 may include a transmission filter, a reception filter, an amplifier, a mixer, an oscillator, a digital-to-analog converter (DAC), an analog-to-digital converter (ADC), and so forth. Although one antenna is illustrated in the foregoing drawing, the UE may also include a plurality of antennas. The RF processor 2h-10 may include a plurality of RF chains. The RF processor 2h-10 may perform beamforming. For the beamforming, the RF processor 2h-10 may adjust phases and magnitudes of signals transmitted and received through a plurality of antennas or antenna elements.

The RF processor may also perform MIMO and may receive several layers when performing MIMO operations.

The baseband processor 2h-20 may perform conversion between a baseband signal and a bitstream according to physical layer standards of a system. For example, in data transmission, the baseband processor 2h-20 may generate complex symbols by encoding and modulating a transmission bitstream. In data reception, the baseband processor 2h-20 may recover a received bitstream by demodulating and decoding the baseband signal provided from the RF processor 2h-10. For example, when OFDM is used, in data transmission, the baseband processor 2h-20 may generate complex symbols by encoding and modulating a transmission bitstream, map the complex symbols to subcarriers, and construct OFDM symbols through IFFT and CP insertion. Also, in data reception, the baseband processor 2h-20 divides the baseband signal provided from the RF processor 2h-10 in the unit of an OFDM symbol, recovers the signals mapped to the subcarriers through FFT, and recovers the received bitstream through demodulation and decoding.

The baseband processor 2h-20 and the RF processor 2h-10 may transmit and receive a signal as described above. Thus, the baseband processor 2h-20 and the RF processor 2h-10 may be indicated by a transmitter, a receiver, a transceiver, or a communicator. Moreover, at least one of the baseband processor 2h-20 and the RF processor 2h-10 may include a plurality of communication modules for supporting a plurality of different radio access technologies.

In addition, at least one of the baseband processor 2h-20 and the RF processor 2h-10 may include multiple communication modules for processing signals in different frequency bands. For example, the different radio access technologies may include a wireless LAN (e.g., IEEE 802.11), a cellular network (e.g., LTE), and the like. In addition, the different frequency bands may include a super high frequency (SHF, e.g., 2.NRHz, NRhz) band, and a millimeter wave (mm-wave, e.g., 60 GHz) band.

The storage 2h-30 may store data such as a basic program for operations of the UE, an application program, configuration information, and so forth. In particular, the storage 2h-30 may store information related to a second connection node for performing wireless communication by using a second wireless connection technique. The storage 2h-30 provides the stored data at the request of the controller 2h-40.

The controller 2h-40 may control overall operations of the UE. For example, the controller 2h-40 may transmit and receive a signal through the baseband processor 2h-20 and the RF processor 2h-10. The controller 2h-40 may record and read data from and in the storage 2h-30. To this end, the controller 2h-40 may include at least one processor. For example, the controller 2h-40 may include a communication processor (CP) for performing control for communication and an application processor (AP) for controlling an upper layer such as an application program.

Figure 2I:
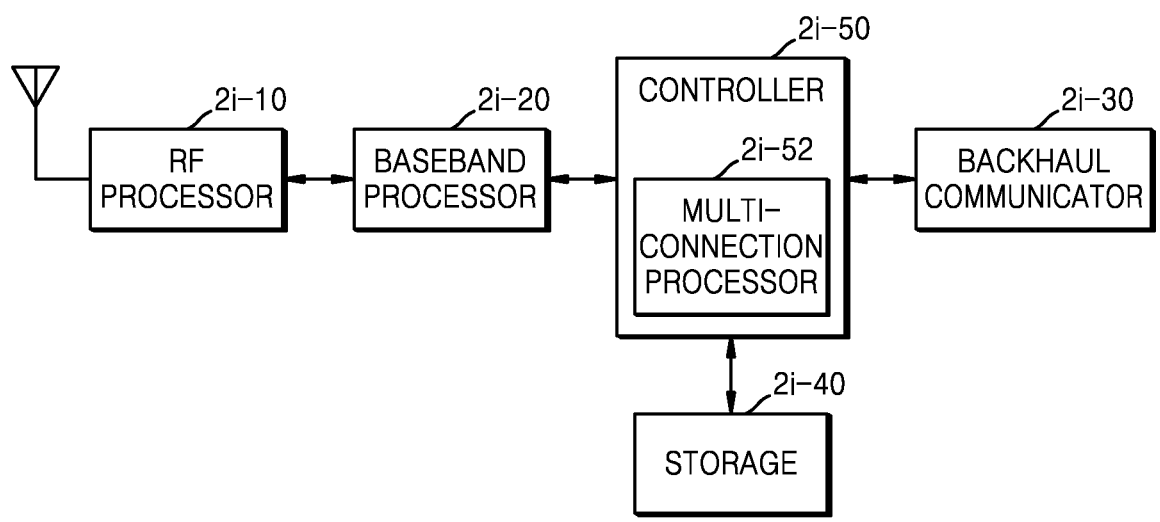
FIG. 2I is a block diagram of a structure of a base station, according to an embodiment.

FIG. 2I is a block diagram of a structure of a base station, according to an embodiment.

Referring to FIG. 2F, the base station may include an RF processor 2i-10, a baseband processor 2i-20, a backhaul communicator 2i-30, a storage 2i-40, and a controller 2i-50.

The RF processor 2i-10 may perform a function for transmitting and receiving a signal through a wireless channel, such as band translation, amplification, and so forth. That is, the RF processor 2i-10 may up-convert a baseband signal provided from the baseband processor 2i-20 into an RF band signal, transmit the RF band signal through an antenna, and down-convert an RF band signal received through the antenna into a baseband signal. For example, the RF processor 2i-10 may include a transmission filter, a reception filter, an amplifier, a mixer, an oscillator, a DAC, an ADC, and so forth. Although one antenna is illustrated in FIG. 1J, the RF processor 2i-10 may also include a plurality of antennas. The RF processor 2i-10 may include a plurality of RF chains. The RF processor 2i-10 may perform beamforming. For the beamforming, the RF processor 2i-10 may adjust phases and magnitudes of signals transmitted and received through multiple antennas or antenna elements. The RF processor 2h-10 may perform downward MIMO operations by transmitting one or more layers.

The baseband processor 2i-20 may perform conversion between a baseband signal and a bitstream according to physical layer standards of the first wireless connection technique. For example, in data transmission, the baseband processor 2i-20 may generate complex symbols by encoding and modulating a transmission bitstream. In data reception, the baseband processor 2i-20 may recover a received bitstream by demodulating and decoding the baseband signal provided from the RF processor 2i-10. For example, when OFDM is used, in data transmission, the baseband processor 2i-20 may generate complex symbols by encoding and modulating a transmission bitstream, map the complex symbols to subcarriers, and construct OFDM symbols through IFFT and CP insertion. Also, in data reception, the baseband processor 2i-20 divides the baseband signal provided from the RF processor 2i-10 in the unit of an OFDM symbol, recovers the signals mapped to the subcarriers through FFT, and recovers the received bitstream through demodulation and decoding. The baseband processor 2i-20 and the RF processor 2i-10 may transmit and receive a signal as described above. Thus, the baseband processor 2i-20 and the RF processor 2i-10 may be indicated by a transmitter, a receiver, a transceiver, a communicator, or a wireless communicator.

The backhaul communicator 2i-30 may provide an interface for performing communication with other nodes in a network. That is, the backhaul communicator 2i-30 may convert a bitstream transmitted to another node, e.g., an auxiliary base station, a core network, etc., into a physical signal, and convert a physical signal received from the another node into a bitstream.

The storage 2i-40 may store data such as a basic program for operations of a main base station, an application program, configuration information, and so forth. In particular, the storage 2i-40 may store information about a bearer allocated to the connected UE, and a measurement result reported from the connected UE. The storage 2i-40 may store information that is a criterion for determining whether to provide or stop multiple connections to the UE. The storage 2i-40 provides the stored data at the request of the controller 2i-50.

The controller 2i-50 may control overall operations of the main base station. For example, the controller 2i-50 may transmit and receive a signal through the baseband processor 2i-20 and the RF processor 2i-10 or through the backhaul communicator 2i-30. The controller 2i-50 may record and read data from and in the storage 2i-40. To this end, the controller 2i-50 may include at least one processor.

Meanwhile, the embodiments disclosed in the present specification and drawings have been provided to easily describe the present disclosure and to help understanding of the present disclosure, and are not intended to limit the scope of the present disclosure. In other words, it is apparent to one of ordinary skill in the art that various changes may be made thereto without departing from the scope of the present disclosure. Further, the embodiments of the present disclosure may be practiced in combination. For example, a base station and a UE may be managed by combining an embodiment of the disclosure with some parts of another embodiment of the disclosure. Although the embodiments of the disclosure have been described based on a frequency division duplexing (FDD) LTE system, modified examples based on the technical spirit of the embodiments may also be carried out in other systems such as a time division duplexing (TDD) LTE system, a 5G or NR system, etc.

The invention claimed is:

1. A communication method of a user equipment (UE) in a wireless communication system, the communication method comprising:
receiving, from a base station, a UE capability information request message including radio access technology (RAT) type information associated with at least one of new radio (NR), evolved umts terrestrial radio access network (EUTRA), or EUTRA-NR; and
transmitting, to the base station, a non-access stratum (NAS) message including a UE capability identifier,
wherein the UE capability identifier is assigned by a core network through NAS signaling and includes a public land mobile network (PLMN)-specific UE capability identifier or a manufacturer-specific UE capability identifier, and
wherein a number of the PLMN-specific UE capability identifier stored in the UE is limited.

2. The communication method of claim 1, wherein the UE capability identifier is configured based on the RAT type information.

3. The communication method of claim 1, further comprising storing the PLMN-specific UE capability identifier, wherein, in case that a number of PLMN-specific UE capability identifiers stored in the UE exceeds the limitation, a previously stored PLMN-specific UE capability identifier is deleted.

4. The communication method of claim 1, wherein the transmitting of the NAS message comprising the UE capability identifier comprises transmitting an NAS message including the manufacturer-specific UE capability identifier in case that the UE is not assigned with the PLMN-specific UE capability identifier.

5. The communication method of claim 1, further comprising:
determining whether capability information of the UE has changed; and
transmitting a message including information indicating that a new PLMN-specific UE capability identifier needs to be updated, based on a result of the determining.

6. The communication method of claim 1, wherein storing the UE capability identifier corresponds to UE capability information, and
wherein mapping information between the UE capability information and the UE capability information is stored.

7. A communication method of an entity in a core network in a wireless communication system, the communication method comprising:
transmitting, to a user equipment (UE), a message requesting UE capability information to a UE through a base station, wherein the message comprises radio access technology (RAT) type information associated with at least one of new radio (NR), or evolved umts terrestrial radio access network (EUTRA), or EUTRA-NR; and
receiving a non-access stratum (NAS) message including a UE capability identifier through the base station,
wherein the UE capability identifier is assigned by the core network through NAS signaling and includes a public land mobile network (PLMN)-specific UE capability identifier or a manufacturer-specific UE capability identifier, and
wherein a number of the PLMN-specific UE capability identifier stored in the UE is limited.

8. The communication method of claim 7, wherein the UE capability identifier is configured based on the RAT type information.

9. The communication method of claim 7, further comprising:
identifying the UE capability identifier; and
determining whether UE capability information corresponding to the UE capability identifier are stored,
wherein mapping information between the UE capability identifier and the UE capability information is stored.

10. The communication method of claim 7, wherein the receiving of the NAS message including the UE capability identifier comprises receiving an NAS message comprising the manufacturer-specific UE capability identifier in case that the UE is not assigned with the PLMN-specific UE capability identifier.

11. The communication method of claim 7, further comprising receiving a message including information indicating that a new PLMN-based UE capability identifier needs to be updated, based on determination of whether capability information of the UE has changed, when capability information of the UE has changed.

12. A user equipment (UE) for providing UE capability information in a wireless communication system, the UE comprising:
a transceiver; and
at least one processor coupled with the transceiver configured to receive, from a base station, a UE capability information request message including radio access technology (RAT) type information and transmit, to the base station, a non-access stratum (NAS) message including a UE capability identifier, the RAT type information associated with at least one of new radio (NR), evolved umts terrestrial radio access network (EUTRA), or EUTRA-NR,
wherein the UE capability identifier is assigned by a core network through NAS signaling and includes a public land mobile network (PLMN)-specific UE capability identifier or a manufacturer-specific UE capability identifier, and
wherein a number of the PLMN-specific UE capability identifier stored in the UE is limited.

13. An entity in a core network configured to communicate based on user equipment (UE) capability information in a wireless communication system, the entity comprising:
a transceiver; and
at least one processor coupled with the transceiver configured to transmit, to a user equipment (UE), a message requesting UE capability information through a base station and receive a non-access stratum (NAS) message including a UE capability identifier through the base station,
wherein the message comprises radio access technology (RAT) type information associated with at least one of new radio (NR), evolved umts terrestrial radio access network (EUTRA), or EUTRA-NR, and
wherein the UE capability identifier is assigned by the core network through NAS signaling and includes a public land mobile network (PLMN)-specific UE capability identifier or a manufacturer-specific UE capability identifier, and wherein a number of the PLMN-specific UE capability identifier stored in the UE is limited.

* * * * *